United States Patent
Lo et al.

(10) Patent No.: US 12,212,437 B2
(45) Date of Patent: Jan. 28, 2025

(54) METHOD AND APPARATUS FOR REFERENCE SYMBOL PATTERN ADAPTATION

(71) Applicant: Samsung Electronics Co., Ltd., Suwon-si (KR)

(72) Inventors: Caleb K. Lo, San Jose, CA (US); Jeongho Jeon, San Jose, CA (US); Joonyoung Cho, Portland, OR (US); Gilwon Lee, McKinney, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 17/652,083

(22) Filed: Feb. 22, 2022

(65) Prior Publication Data

US 2022/0407745 A1 Dec. 22, 2022

Related U.S. Application Data

(60) Provisional application No. 63/217,047, filed on Jun. 30, 2021, provisional application No. 63/210,843, filed on Jun. 15, 2021.

(51) Int. Cl.
*H04L 25/02* (2006.01)
*G06N 20/00* (2019.01)
(Continued)

(52) U.S. Cl.
CPC ....... *H04L 25/0224* (2013.01); *H04B 7/0639* (2013.01); *H04L 5/0048* (2013.01); *H04W 24/02* (2013.01); *G06N 20/00* (2019.01)

(58) Field of Classification Search
CPC ............. H04L 25/0224; H04B 7/0639; H04W 24/02; G06N 20/00
See application file for complete search history.

(56) References Cited

U.S. PATENT DOCUMENTS

| 2018/0324888 A1 | 11/2018 | Shi et al. |
| 2020/0014437 A1* | 1/2020 | Zhang ............... H04L 1/1867 |
| 2020/0045708 A1 | 2/2020 | Hwang et al. |

(Continued)

FOREIGN PATENT DOCUMENTS

| WO | 2020080989 A1 | 4/2020 |
| WO | 2020213964 A1 | 10/2020 |
| WO | 2021112360 A1 | 6/2021 |

OTHER PUBLICATIONS

International Search Report and Written Opinion issued Sep. 20, 2022 regarding International Application No. PCT/KR2022/008490, 9 pages.

(Continued)

*Primary Examiner* — Basil Ma

(57) ABSTRACT

Capability of a user equipment to support machine learning adaptation by a base station of a reference signal pattern is signaled between the base station and the user equipment. Configuration information from the base station indicates one or more of enabling or disabling of machine learning adaptation of the reference signal pattern, a machine learning model used for machine learning adaptation of the reference signal pattern, updated model parameters for the machine learning model, or whether model parameters received from the user equipment will be used for machine learning adaptation of the reference signal pattern. Model training may be performed or model parameters received, and reference signals are received from the base station. Information on a reference signal pattern may be transmitted by the user equipment to the serving base station. Assistance information may be transmitted by the user equipment to the base station, which configures a reference signal pattern.

20 Claims, 18 Drawing Sheets

(51) Int. Cl.
  *H04B 7/06* (2006.01)
  *H04L 5/00* (2006.01)
  *H04W 24/02* (2009.01)

(56) References Cited

U.S. PATENT DOCUMENTS

| | | |
|---|---|---|
| 2021/0044411 A1 | 2/2021 | Ge et al. |
| 2021/0049451 A1 | 2/2021 | Wang et al. |
| 2021/0064996 A1* | 3/2021 | Wang .................. H04W 24/08 |
| 2021/0067297 A1 | 3/2021 | Farmanbar et al. |
| 2022/0294666 A1* | 9/2022 | Jeon .................. H04L 25/0254 |
| 2022/0393781 A1 | 12/2022 | Kim et al. |

OTHER PUBLICATIONS

"3rd Generation Partnership Project; Technical Specification Group Radio Access Network; NR; Physical channels and modulation (Release 17)", 3GPP TS 38.211 v17.0.0, Dec. 2021, 134 pages.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

"5G; NR; Physical layer procedures for data (3GPP TS 38.214 version 16.4.0 Release 16)", ETSI TS 138 214 V16.4.0, Jan. 2021, 173 pages.

"5G; NR; Medium Access Control (MAC) protocol specification (3GPP TS 38.321 version 16.3.0 Release 16)", ETSI TS 138 321 V16.3.0, Jan. 2021, 158 pages.

Extended European Search Report issued Sep. 23, 2024 regarding Application No. 22825323.3, 10pages.

\* cited by examiner

METHOD AND APPARATUS FOR REFERENCE SYMBOL PATTERN ADAPTATION

CROSS-REFERENCE TO RELATED APPLICATION AND CLAIM OF PRIORITY

This application claims priority under 35 U.S.C. § 119(e) to U.S. Provisional Patent Application No. 63/210,843 filed Jun. 15, 2021 and U.S. Provisional Patent Application No. 63/217,047 filed Jun. 30, 2021. The above-identified patent document(s) are incorporated herein by reference.

TECHNICAL FIELD

The present disclosure relates generally to reference symbol patterns in communications systems, and more specifically to adaptation of reference signal patterns based on artificial intelligence and/or machine learning.

BACKGROUND

To meet the demand for wireless data traffic having increased since deployment of $4^{th}$ Generation (4G) or Long Term Evolution (LTE) communication systems and to enable various vertical applications, efforts have been made to develop and deploy an improved $5^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, $6^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

A framework is disclosed for supporting AI/ML techniques for RS pattern selection based on the statistics of the underlying randomly-varying wireless channel. Capability of a user equipment to support machine learning adaptation by a base station of a reference signal pattern is signaled between the base station and the user equipment. Configuration information from the base station indicates one or more of enabling or disabling of machine learning adaptation of the reference signal pattern, a machine learning model used for machine learning adaptation of the reference signal pattern, updated model parameters for the machine learning model, or whether model parameters received from the user equipment will be used for machine learning adaptation of the reference signal pattern. Model training may be performed or model parameters received, and reference signals are received from the base station. Information on a reference signal pattern may be transmitted by the user equipment to the serving base station. Assistance information may be transmitted by the user equipment to the base station, which configures a reference signal pattern.

In one embodiment, a UE includes a transceiver configured to transmit, to a serving base station (BS), information indicating capability of the UE to support machine learning (ML) adaptation of a reference signal (RS) pattern, and receive configuration information from the serving BS, the configuration information indicating one or more of enabling or disabling of ML adaptation of the RS pattern, an ML model used for ML adaptation of the RS pattern, updated model parameters for the ML model, or whether model parameters received from the UE will be used for ML adaptation of the RS pattern. The UE also includes a processor operatively coupled to the transceiver. The processor may be configured to perform ML model training or receive ML model parameters, and the transceiver may be configured to receive RSs from the serving BS or transmit information on an RS pattern to the serving BS. The transceiver may be configured to transmit assistance information to the serving BS, and receive configuration of a RS pattern from the serving BS.

In another embodiment, a method includes transmitting, from a user equipment (UE) to a serving base station (BS), information indicating capability of the UE to support machine learning (ML) adaptation of a reference signal (RS) pattern. The method includes receiving configuration information from the serving BS, the configuration information indicating one or more of enabling or disabling of ML adaptation of the RS pattern, an ML model used for ML adaptation of the RS pattern, updated model parameters for the ML model, or whether model parameters received from the UE will be used for ML adaptation of the RS pattern. The method may include performing ML model training or receiving ML model parameters, receiving RSs from the serving BS, and transmitting information on an RS pattern to the serving BS. The method may include transmitting assistance information to the serving BS and receiving configuration of a RS pattern from the serving BS.

In a third embodiment, a BS includes a transceiver configured to receive, from a user equipment (UE), information indicating capability of the UE to support machine learning (ML) adaptation of a reference signal (RS) pattern, and to transmit configuration information to the UE, the configuration information indicating one or more of enabling or disabling of ML adaptation of the RS pattern, an ML model used for ML adaptation of the RS pattern, updated model parameters for the ML model, or whether model parameters received from the UE will be used for ML adaptation of the RS pattern. A processor is operatively coupled to the transceiver. The transceiver is configured to transmit RSs to the UE, and receive information on an RS pattern from the UE.

For any of the preceding embodiments, the information on an RS pattern transmitted by the UE to the BS may include information on one of a downlink RS pattern or an uplink RS pattern to the serving BS or receiving configuration of one of a downlink RS pattern or an uplink RS pattern from the serving BS.

For any of the preceding embodiments, the configuration of a RS pattern received by the UE from the serving BS may be received via radio resource control (RRC) signaling, where the configuration is indicated by one of an RS pattern index or a time/frequency density for the RS pattern.

For any of the preceding embodiments, assistance information transmitted by the UE to the serving BS to support adaptation of an RS pattern may comprise one or more of UE location, UE speed, UE trajectory, estimated downlink (DL) channel delay spread, estimated DL channel Doppler spread, estimated DL channel coherence bandwidth, estimated DL channel coherence time, or radio resource management (RRM) metrics, wherein the assistance information is used for model inference of an RS pattern, wherein a format for the assistance information is transmitted via a physical uplink control channel (PUCCH) or a physical uplink shared channel (PUSCH), and wherein a format for the assistance information comprises one of a new uplink control information (UCI) type, a new PUCCH format, or a new media access control-control element (MAC-CE).

For any of the preceding embodiments, wherein the UE may include an ML model inference result in the assistance information, wherein the ML model inference result comprises one or more of a recommendation for a reference symbol pattern index, a recommendation for a reference symbol density in the time domain, or a recommendation for a reference symbol density in the frequency domain.

For any of the preceding embodiments, the UE may receive, from the BS, configuration of one of a UE-specific or site-specific codebook or an update for the one of the UE-specific or site-specific codebook, the one of the UE-specific or site-specific codebook including common parts and UE-specific or site-specific parts, a UE-specific or site-specific RS pattern, and artificial intelligence (AI) or ML parameters for channel state information (CSI) feedback.

For any of the preceding embodiments, the UE may receive, from the BS, configuration of the RS pattern from the serving BS via radio resource control (RRC) signaling, wherein the configuration is indicated by one of an RS pattern index or a time/frequency density for the RS pattern.

For any of the preceding embodiments, the UE may be configured to use a default codebook in addition to the one of the UE-specific or site-specific codebook.

For any of the preceding embodiments, the UE-specific or site-specific codebook may be a linear combination codebook, in which parameters related to basis selection procedures or codebooks to express linear combination coefficients are UE-specifically or site-specifically configured.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
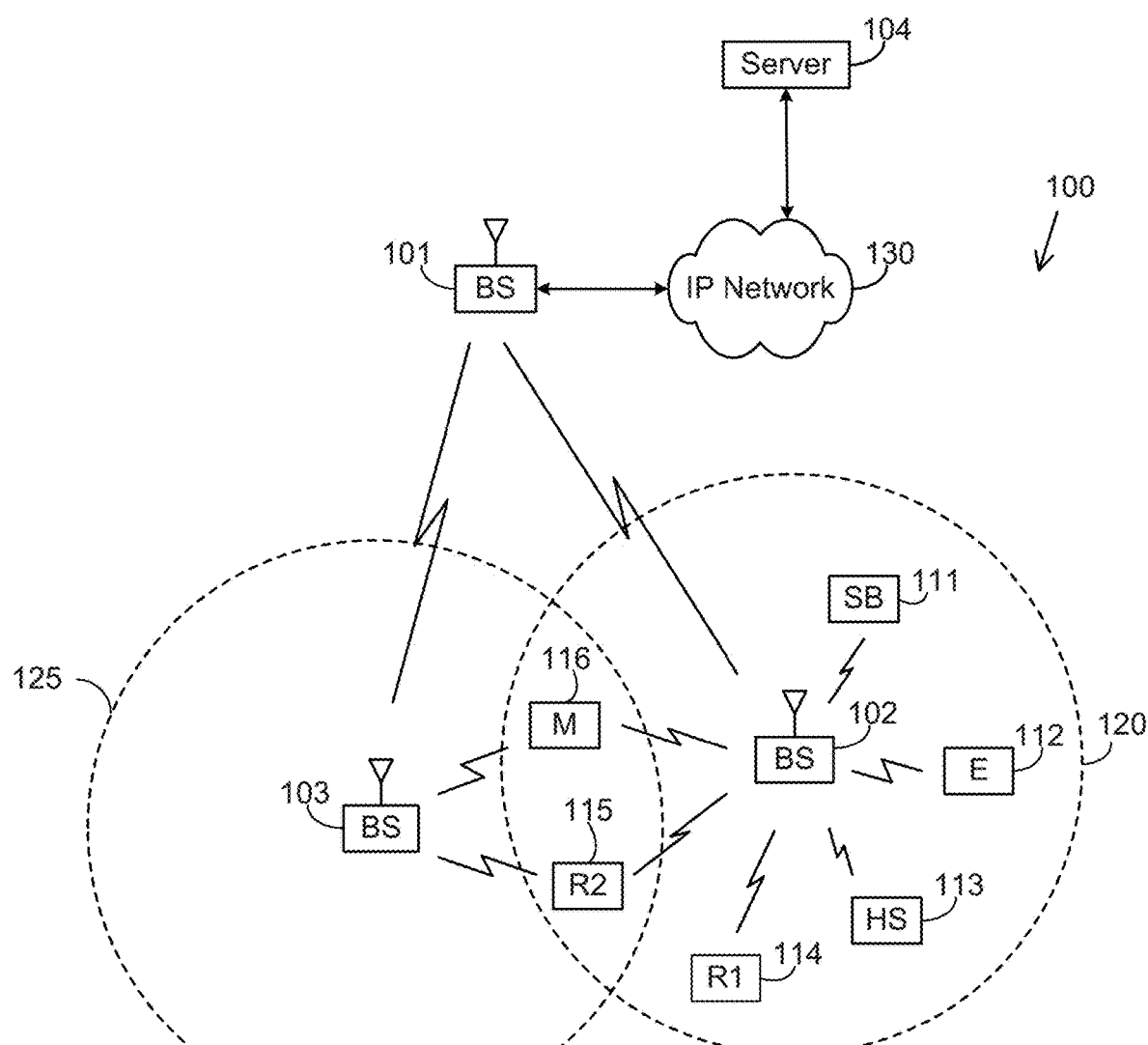
FIG. 1 illustrates an exemplary networked system utilizing reference symbol pattern adaptation in wireless transmission and reception according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

1] 3GPP, TS 38.211, 5G; NR; Physical channels and modulation.
[2] 3GPP, TS 38.331, Rel-16 v16.3.1, "NR; Radio Resource Control (RRC) protocol specification," January 2021.
[3] 3GPP TS 38.214 Rel-16 v16.4.0, "NR; Physical layer procedures for data," January 2021.
[4] 3GPP TS 38.321 Rel-16 v16.3.0, "NR; Medium Access Control (MAC) protocol specification," January 2021.

The above-identified references are incorporated herein by reference.

ABBREVIATIONS

3GPP 3rd Generation Partnership Project
5G Fifth Generation
LTE Long-Term Evolution
AI Artificial Intelligence
CDM Code Division Multiplexing
CSI Channel State Information
RI Rank Indicator
CQI Channel Quality Indicator
PMI Precoding Matrix Indicator
LI Layer Indicator
CSI-RS Channel State Information Reference Signal
CRI CSI-RS Resource Indicator
gNB gNodeB (Base Station)
ML Machine Learning
NR New Radio
FDD Frequency Division Duplex
TDD Time Division Duplex
OFDM Orthogonal Frequency Division Multiplexing
PDSCH Physical Downlink Shared Channel
PUCCH Physical Uplink Control Channel
PUSCH Physical Uplink Shared Channel
RAN Radio Access Network
O-RAN Open Radio Access Network
RRM Radio Resource Management
RS Reference Signal
DMRS Demodulation Reference Signal
SRS Sounding Reference Signal UE User Equipment
AI-CFI Artificial Intelligent-Channel Feature Information
SCell Secondary Cell
SpCell Special Cell
PCell Primary Cell
RAT Radio Access Technology
RRC Radio Resource Control
DCI Downlink Control Information
MAC-CE Medium Access Control-Control Element
DL Downlink
UL Uplink In 5G NR, several types of RS have been defined. For example, channel state information reference signals (CSI-RS) are used for DL communication between a gNB and a UE, where the UE uses received CSI-RS to measure DL CSI and report those measurements to the gNB. Also, DMRS are used by a receiver (either for DL or UL communications) to estimate CSI; this estimate is used to demodulate received data.

A time-frequency mapping function is applied to RS such as CSI-RS and DMRS before those signals are transmitted, yielding a particular RS pattern. The RS pattern depends on parameters such as transmit antenna port, CDM type, and whether or not frequency hopping is enabled.

It may be advantageous to vary the RS pattern based on the statistics of an underlying randomly-varying wireless channel. For example, a block fading channel is strongly correlated across a coherence interval. To estimate the wireless channel within this coherence interval, one can utilize an RS pattern that places RS on all of the subcarriers for the first OFDM symbol in this interval. This RS pattern will yield a lower CSI estimation error than another RS pattern that places RS on every other subcarrier over every third OFDM symbol in this interval. As another example, if the channel selectivity in time/frequency increases, then increasing the time/frequency density of RS would reduce the CSI estimation error.

5G NR supports flexibility in the selection of an RS pattern, where the selection of an RS pattern is based on the statistics of the underlying randomly-varying wireless channel. For example, the parameter dmrs-AdditionalPosition can be used to increase the number of DMRS in a given slot in high-mobility scenarios. As another example, the parameters periodicityAndOffset-p and periodicityAndOffset-sp can be used to vary the periodicity (and slot offset) of SRS. The details of the algorithm for selecting an RS pattern are typically left to the network.

The present disclosure describes a framework for supporting AI/ML techniques for RS pattern selection based on the statistics of the underlying randomly-varying wireless channel. The corresponding signaling details are discussed in this disclosure.

This disclosure addresses the issue that RS pattern adaptation is currently left up to network implementation. Methods that the network can use to configure the RS patterns using AI/ML-based solutions and a framework for adapting the RS pattern based on UE inference and information are provided. Details on the support of AI/ML techniques for RS pattern selection are disclosed, including information elements to be exchanged between a transmitter and a receiver.

FIG. 1 illustrates an exemplary networked system utilizing reference symbol pattern adaptation in wireless transmission and reception according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network. Each BS 101, 102 and 103 may be terrestrial, and the wireless network 100 may be a terrestrial network, or at least BS 102 and/or BS 103 may be non-terrestrial (e.g., airborne or spaceborne), and the wireless network 100 may be an NTN, in embodiments of the present disclosure.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. One or more of UEs 111, 112, 113, 114, 115, and 116 may be moving at high speed relative to BS 102 and/or BS 103, such as on a high speed train, in embodiments of the present disclosure. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, NR, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the terms "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
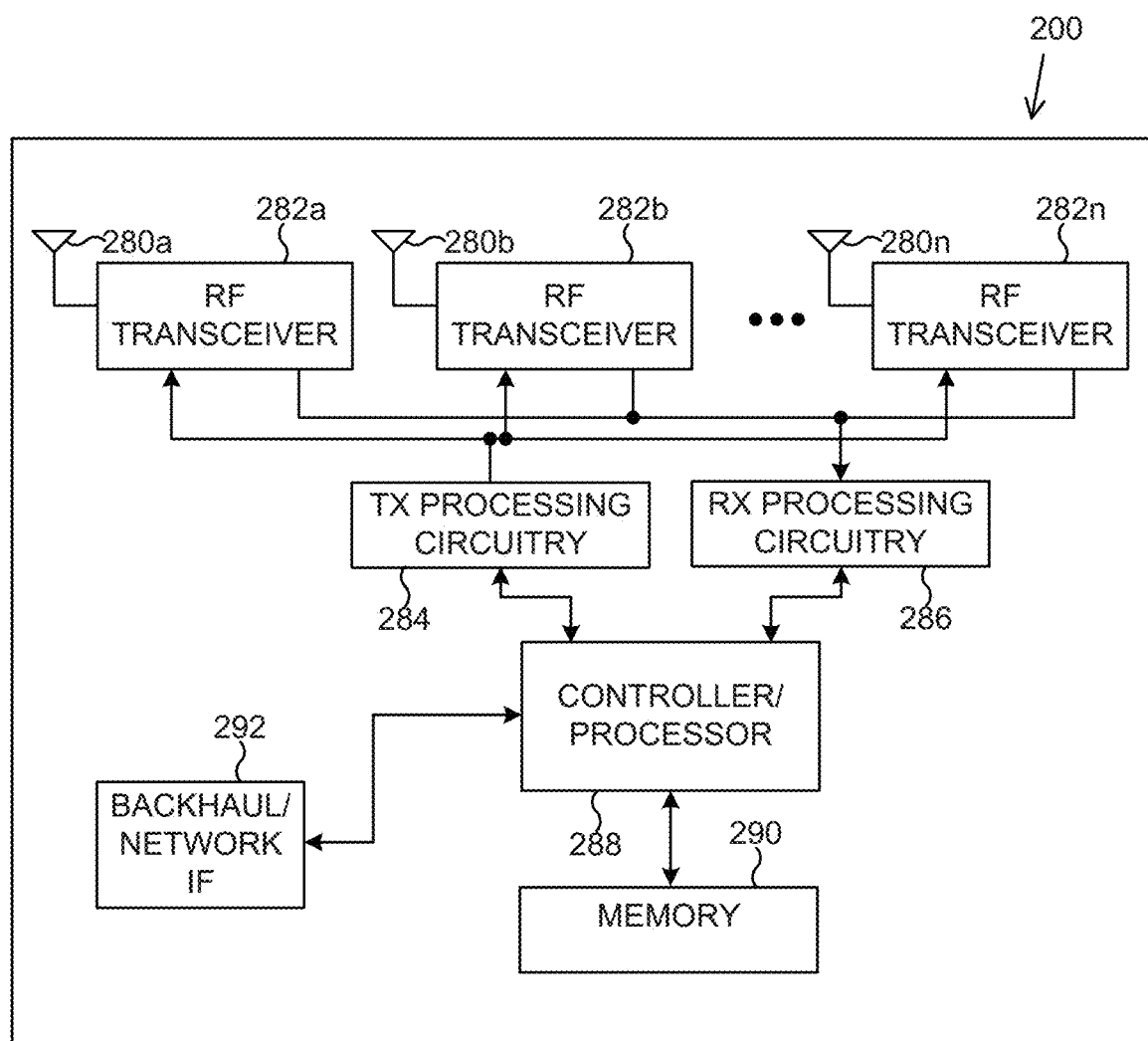
FIG. 2 illustrates an exemplary base station (BS) utilizing reference symbol pattern adaptation in wireless transmission and reception according to various embodiments of this disclosure.

FIG. 2 illustrates an exemplary base station (BS) utilizing reference symbol pattern adaptation in wireless transmission and reception according to various embodiments of this disclosure. The embodiment of the BS 200 illustrated in FIG. 2 is for illustration only, and the BSs 101, 102 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 200 includes multiple antennas 280a-280n, multiple radio frequency (RF) transceivers 282a-282n, transmit (TX or Tx) processing circuitry 284, and receive (RX or Rx) processing circuitry 286. The BS 200 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 200. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 200 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 200 to communicate with other devices or systems over a backhaul connection or over a network. The interface 292 could support communications over any suitable wired or wireless connection(s). For example, when the BS 200 is implemented as part of a cellular communication system (such as one supporting 6G, 5G, LTE, or LTE-A), the interface 292 could allow the BS 200 to communicate with other BSs over a wired or wireless backhaul connection. When the BS 200 is implemented as an access point, the interface 292 could allow the BS 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 200, various changes may be made to FIG. 2. For example, the BS 200 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the BS 200 could include multiple instances of each (such as one per RF transceiver). Also, various components in FIG. 2 could be combined, further subdivided, or omitted and additional components could be added according to particular needs.

Figure 3:
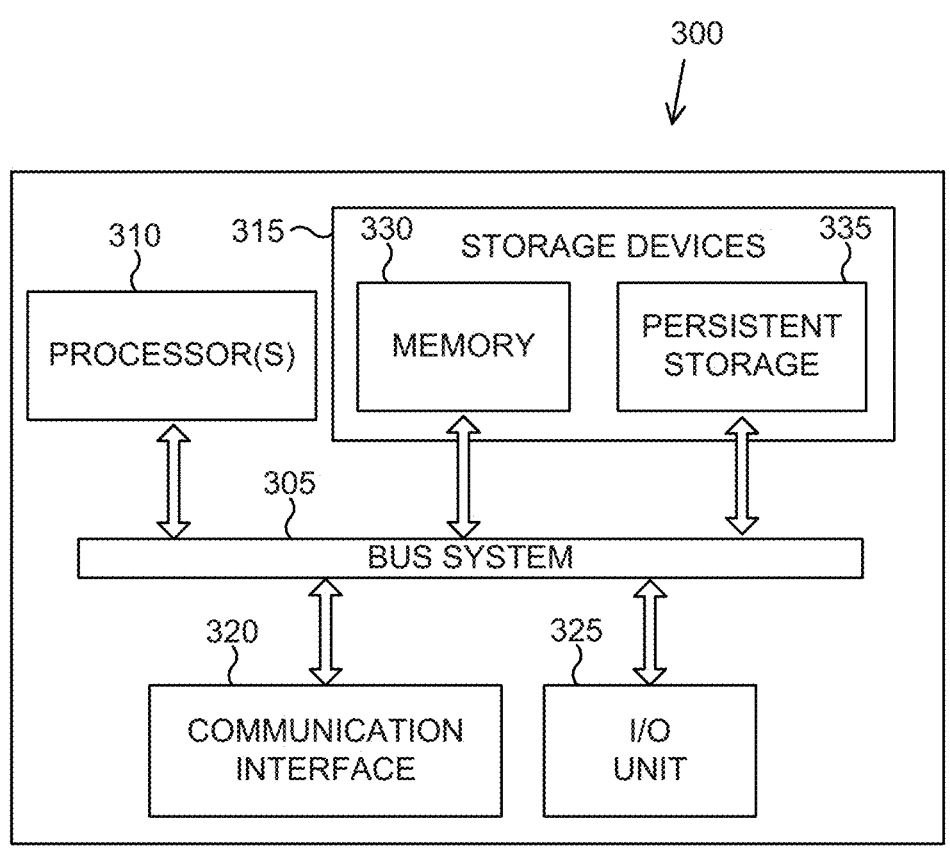
FIG. 3 illustrates an exemplary electronic device for communicating in the networked computing system utilizing reference symbol pattern adaptation in wireless transmission and reception according to various embodiments of this disclosure.

FIG. 3 illustrates an exemplary electronic device for communicating in the networked computing system utilizing reference symbol pattern adaptation in wireless transmission and reception according to various embodiments of this disclosure. In one embodiment, the electronic device 300 is a user equipment implemented as a mobile device, which can represent one of the UEs 111, 112, 113, 114, 115 and 116 in FIG. 1.

As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

Although FIG. 3 illustrates an example of an electronic device 300 in a wireless system including a plurality of such electronic devices, such as UEs 111, 112, 113, 114, 115 and 116 in FIG. 1, various changes may be made to FIG. 3. For example, various components in FIG. 3 can be combined, further subdivided, or omitted and additional components could be added according to particular needs. In addition, as with computing and communication networks, electronic devices can come in a wide variety of configurations, and FIG. 3 does not limit this disclosure to any particular electronic device.

In one embodiment, the framework for supporting AI/ML techniques for RS pattern selection can include model training at a UE or a network entity or outside of the network (e.g. via offline training), and model inference operations at a UE.

Figure 4:
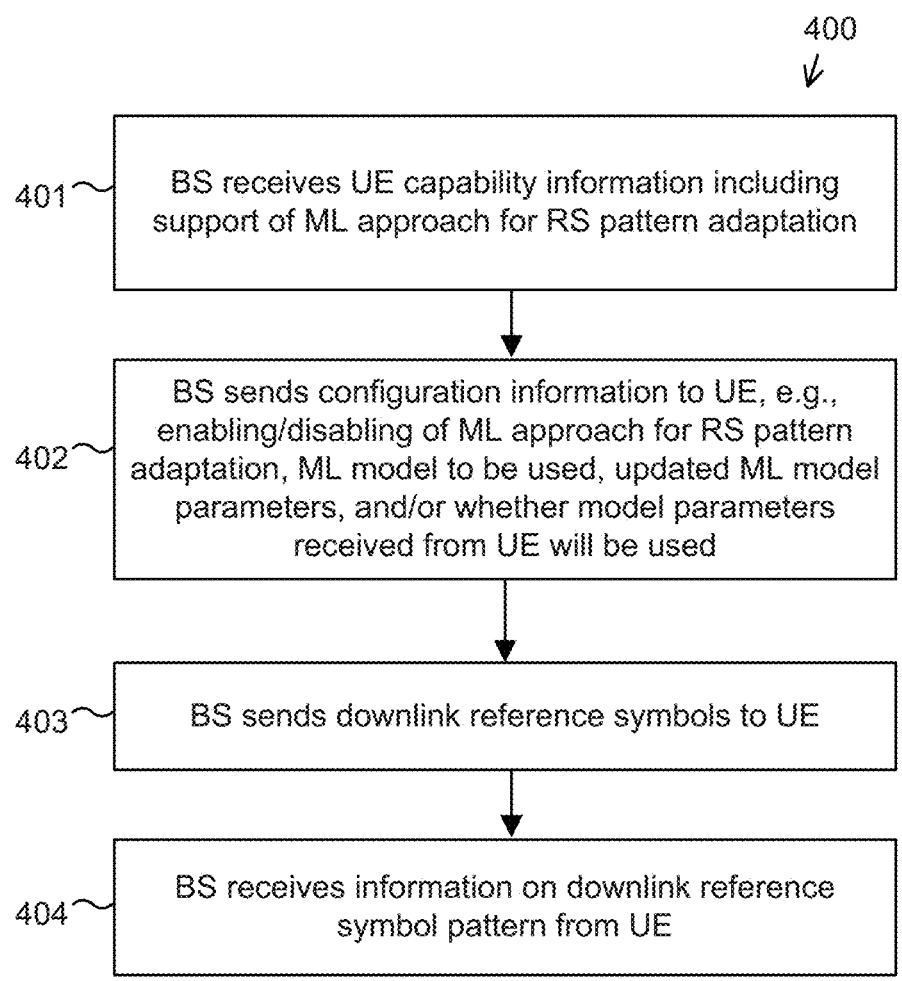
FIG. 4 illustrates a high level flowchart for an example of BS operation to support UE information on DL RS patterns according to various embodiments of this disclosure.

FIG. 4 illustrates a high level flowchart for an example of BS operation to support UE information on DL RS patterns according to various embodiments of this disclosure. The embodiment of FIG. 4 is for illustration only. Other embodiments of the process 400 could be used without departing from the scope of this disclosure.

FIG. 4 is an example of a method 400 for operations at a BS to support AI/ML techniques for DL RS pattern selection where a UE sends information on a particular DL RS pattern. At operation 401, a BS receives UE capability information from a UE, including the support of an ML approach for RS pattern adaptation. At operation 402, a BS sends configuration information to a UE, which can include ML-related configuration information such as enabling/disabling of an ML approach for RS pattern adaptation, an ML model to be used, trained model parameters, and/or whether model parameter updates reported by a UE will be used or not. At operation 403, a BS sends DL RS to a UE. At operation 404, a BS receives information on a DL RS pattern from a UE, where the message can work as a recommendation to the BS. In one example, information can consist of an index to a pre-defined lookup table. In another example, information can consist of a value for the DL RS density in time and/or frequency.

Figure 5:
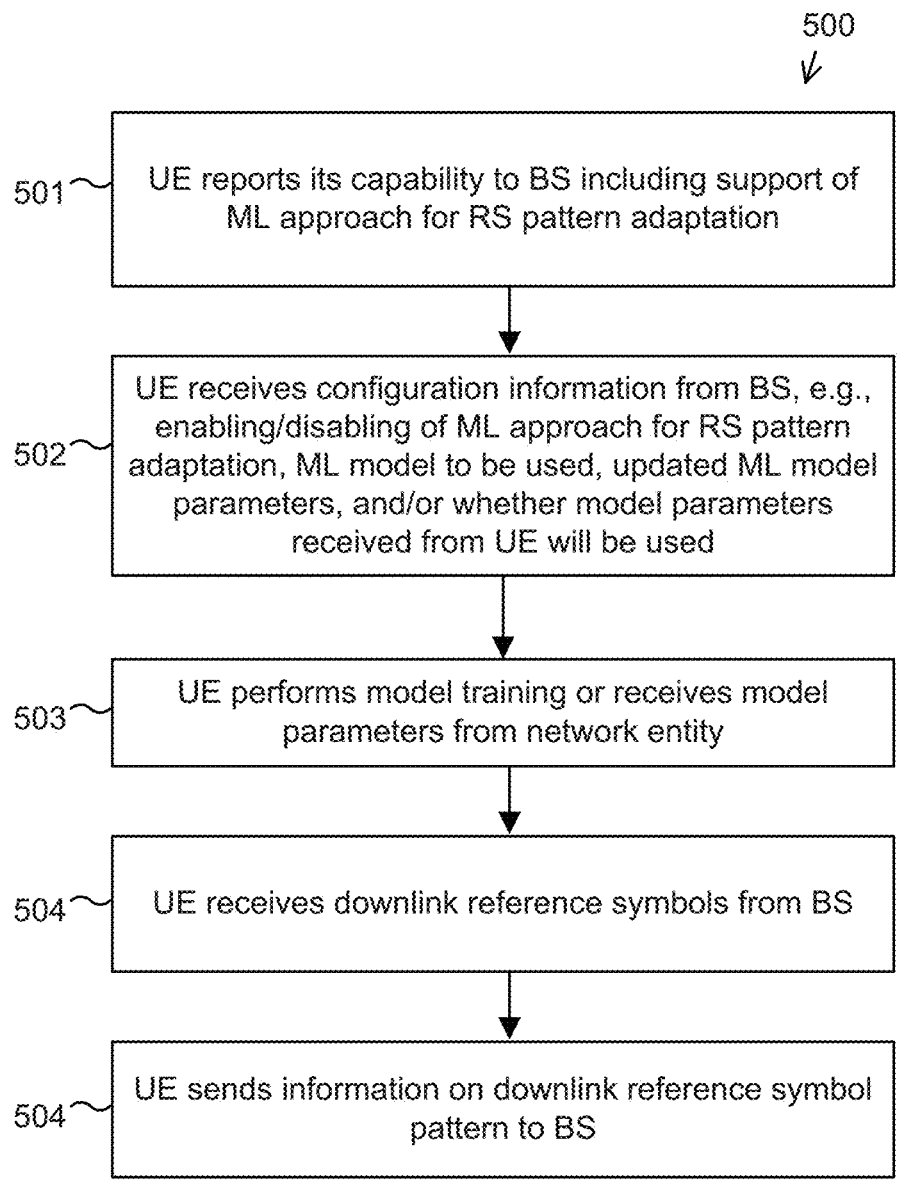
FIG. 5 illustrates a high level flowchart for an example of UE operation to support UE information on DL RS patterns according to various embodiments of this disclosure.

FIG. 5 illustrates a high level flowchart for an example of UE operation to support UE information on DL RS patterns according to various embodiments of this disclosure. The embodiment of FIG. 5 is for illustration only. Other embodiments of the process 500 could be used without departing from the scope of this disclosure.

FIG. 5 is an example of a method 500 for operations at a UE to support AI/ML techniques for DL RS pattern selection where a UE sends information on a particular DL RS pattern. At operation 501, a UE reports capability information to a BS, including the support of an ML approach for RS pattern adaptation. At operation 502, a UE receives configuration information from a BS, which can include ML-related configuration information such as enabling/disabling of an ML approach for RS pattern adaptation, an ML model to be used, trained model parameters, and/or whether model parameter updates reported by a UE will be used or not. At operation 503, a UE performs model training, or receives model parameters from a network entity. In one embodiment, model training can be performed at a UE. Alternatively, model training can be performed at another network entity (e.g., the O-RAN defined RAN Intelligent Controller), and trained model parameters can be sent to a UE. In yet another embodiment, model training can be performed offline (e.g., model training is performed outside of the network), and the trained model parameters can be sent to a UE or a network entity. At operation 504, a UE receives DL RS from a BS. At operation 505, a UE sends information on a DL RS pattern to a BS, where the message can work as a recommendation to the BS. In one example, information can consist of an index to a pre-defined lookup table. In another example, information can consist of a value for the DL RS density in time and/or frequency.

Figure 6:
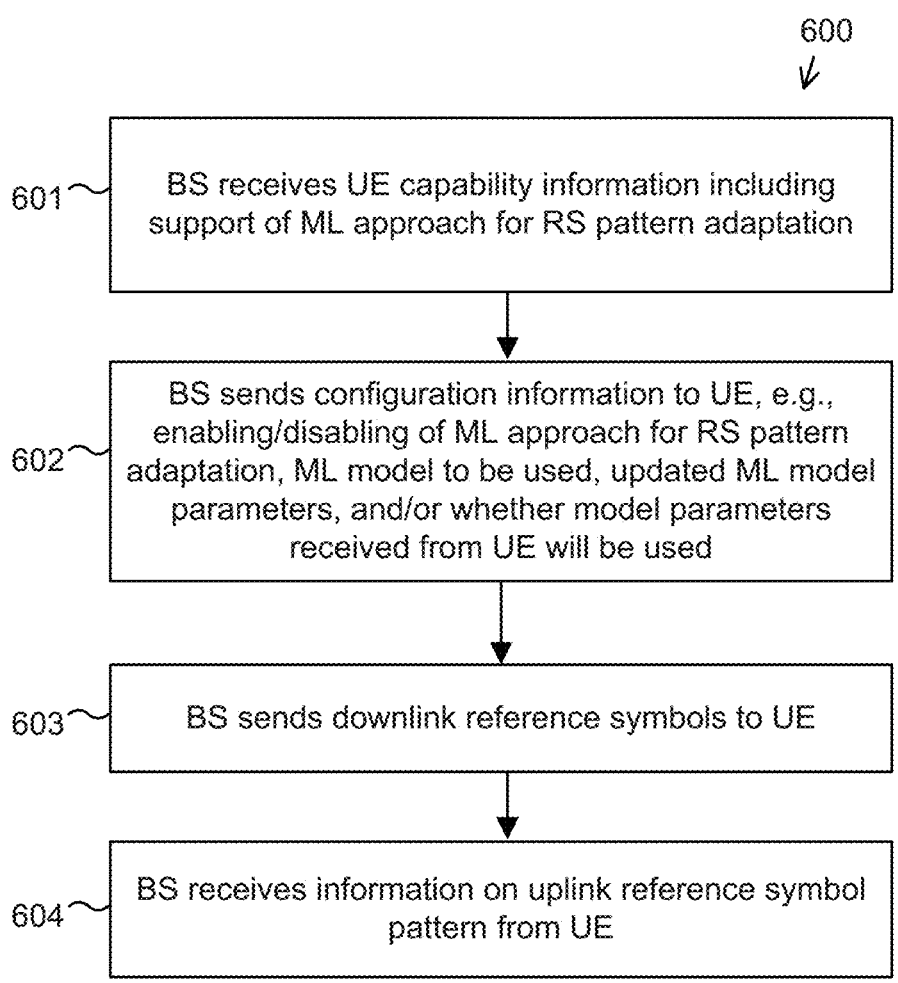
FIG. 6 illustrates a high level flowchart for an example of BS operation to support UE information on UL RS patterns according to various embodiments of this disclosure.

FIG. 6 illustrates a high level flowchart for an example of BS operation to support UE information on UL RS patterns according to various embodiments of this disclosure. The embodiment of FIG. 6 is for illustration only. Other embodiments of the process 600 could be used without departing from the scope of this disclosure.

FIG. 6 is an example of a method 600 for operations at a BS to support AI/ML techniques for UL RS pattern selection where a UE sends information on a particular UL RS pattern. At operation 601, a BS receives UE capability information from a UE, including the support of an ML approach for RS pattern adaptation. At operation 602, a BS sends configuration information to a UE, which can include ML-related configuration information such as enabling/disabling of an ML approach for RS pattern adaptation, an ML model to be used, trained model parameters, and/or whether model parameter updates reported by a UE will be used or not. At operation 603, a BS sends DL RS to a UE. At operation 604, a BS receives information on a UL RS pattern from a UE, where the message can work as a recommendation to the BS. In one example, information can consist of an index to a pre-defined lookup table. In another example, information can consist of a value for the UL RS density in time and/or frequency.

Figure 7:
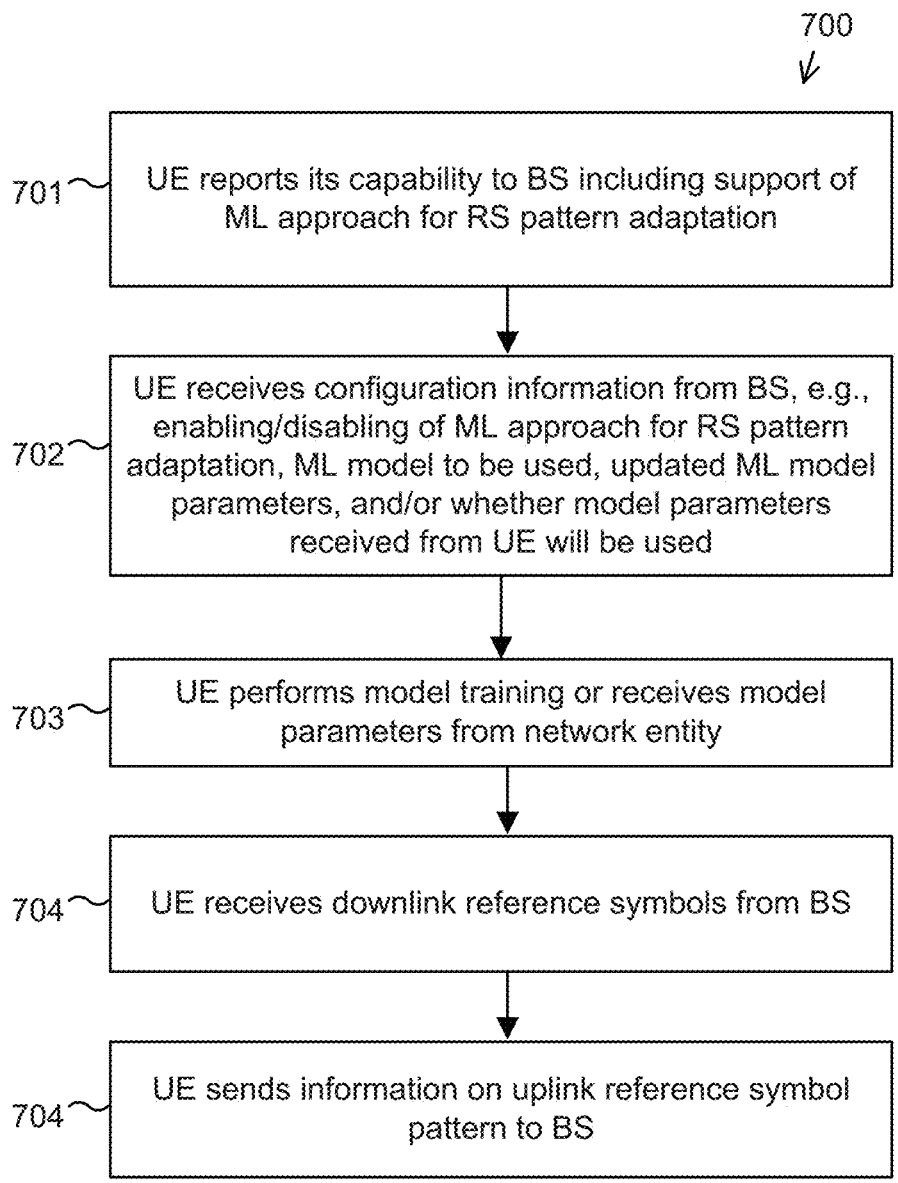
FIG. 7 illustrates a high level flowchart for an example of UE operation to support UE information on UL RS patterns according to various embodiments of this disclosure.

FIG. 7 illustrates a high level flowchart for an example of UE operation to support UE information on UL RS patterns according to various embodiments of this disclosure. The embodiment of FIG. 7 is for illustration only. Other embodiments of the process 700 could be used without departing from the scope of this disclosure.

FIG. 7 is an example of a method 700 for operations at a UE to support AI/ML techniques for UL RS pattern selection where a UE sends information on a particular UL RS pattern. At operation 701, a UE reports capability information to a BS, including the support of an ML approach for RS pattern adaptation. At operation 702, a UE receives configuration information from a BS, which can include ML-related configuration information such as enabling/disabling of an ML approach for RS pattern adaptation, an ML model to be used, trained model parameters, and/or whether model parameter updates reported by a UE will be used or not. At operation 703, a UE performs model training, or receives model parameters from a network entity. In one embodiment, model training can be performed at a UE. Alternatively, model training can be performed at another network entity (e.g., the O-RAN defined RAN Intelligent Controller), and trained model parameters can be sent to a UE. In yet another embodiment, model training can be performed offline (e.g., model training is performed outside of the network), and the trained model parameters can be sent to a UE or a network entity. At operation 704, a UE receives DL RS from a BS. At operation 705, a UE sends information on a UL RS pattern to a BS, where the message can work as a recommendation to the BS. In one example, information can consist of an index to a pre-defined lookup table. In another example, information can consist of a value for the UL RS density in time and/or frequency.

In another embodiment, the framework for supporting AI/ML techniques for RS pattern selection can include model training at a BS or a network entity or outside of the network (e.g., via offline training), and model inference operations at a BS or a network entity.

Figure 8:
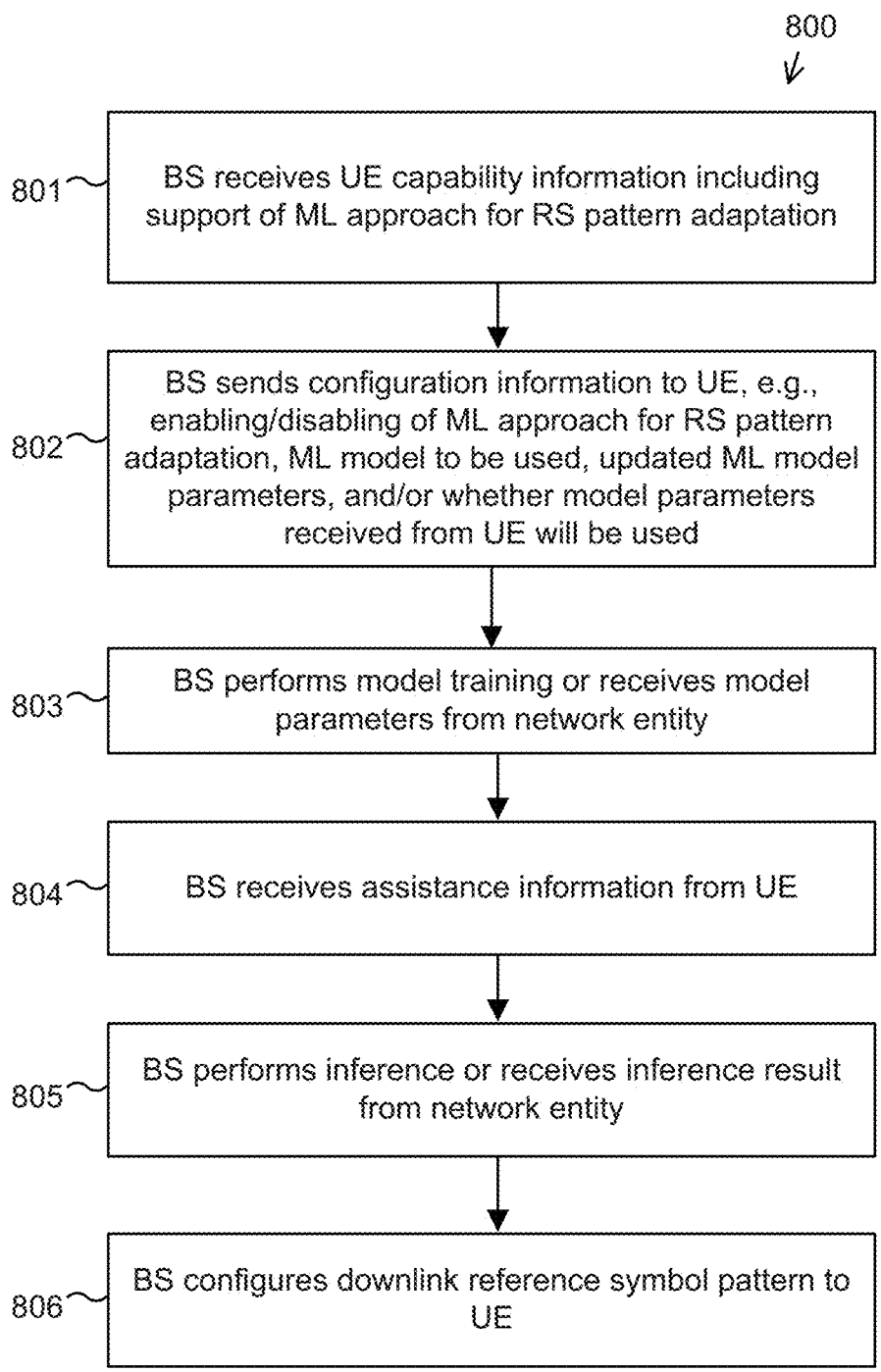
FIG. 8 illustrates a high level flowchart for an example of BS operation to support BS-selected DL RS patterns according to various embodiments of this disclosure.

FIG. 8 illustrates a high level flowchart for an example of BS operation to support BS-selected DL RS patterns according to various embodiments of this disclosure. The embodiment of FIG. 8 is for illustration only. Other embodiments of the process 800 could be used without departing from the scope of this disclosure.

FIG. 8 is an example of a method 800 for operations at a BS to support AI/ML techniques for DL RS pattern selection where a BS selects a particular DL RS pattern. At operation 801, a BS receives UE capability information from a UE, including the support of an ML approach for RS pattern adaptation. At operation 802, a BS sends configuration information to a UE, which can include ML-related configuration information such as enabling/disabling of an ML approach for RS pattern adaptation, an ML model to be used, trained model parameters, and/or whether model parameter updates reported by a UE will be used or not. At operation 803, a BS performs model training, or receives model parameters from a network entity. In one embodiment, model training can be performed at a BS. Alternatively, model training can be performed at another network entity (e.g., the O-RAN defined RAN Intelligent Controller), and trained model parameters can be sent to a BS. In yet another embodiment, model training can be performed offline (e.g., model training is performed outside of the network), and the trained model parameters can be sent to a BS or a network entity. At operation 804, a BS receives assistance information from a UE; the assistance information can include information to be used for model inference, which will be described in the "UE assistance information" section. At operation 805, a BS performs model inference or receives a model inference result from a network entity. At operation 806, a BS configures a DL RS pattern to a UE. In one example, a configuration message can include an index to a pre-defined lookup table. In another example, a configuration message can include a value for the DL RS density in time and/or frequency.

Figure 9:
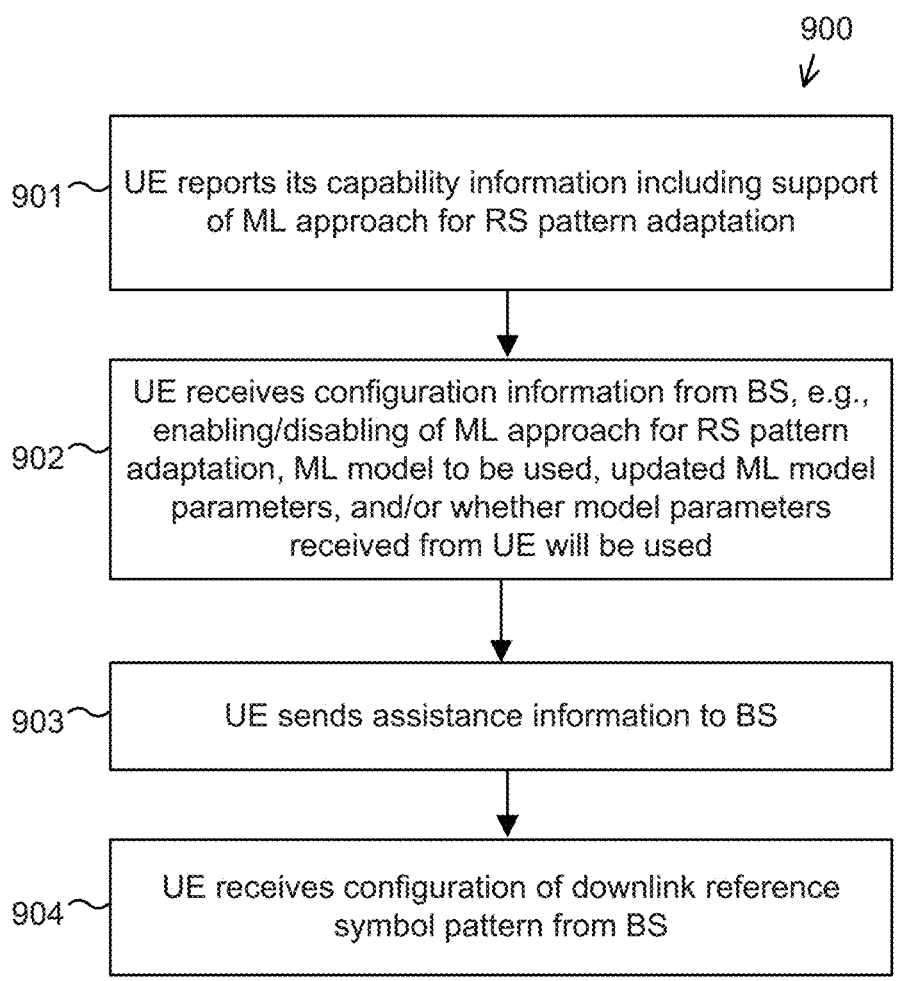
FIG. 9 illustrates a high level flowchart for an example of UE operation to support BS-selected DL RS patterns according to various embodiments of this disclosure.

FIG. 9 illustrates a high level flowchart for an example of UE operation to support BS-selected DL RS patterns according to various embodiments of this disclosure. The embodiment of FIG. 9 is for illustration only. Other embodiments of the process 900 could be used without departing from the scope of this disclosure.

FIG. 9 is an example of a method 900 for operations at a UE to support AI/ML techniques for DL RS pattern selection where a BS selects a particular DL RS pattern. At operation 901, a UE reports capability information to a BS, including the support of an ML approach for RS pattern adaptation. At operation 902, a UE receives configuration information from a BS, which can include ML-related configuration information such as enabling/disabling of an ML approach for RS pattern adaptation, an ML model to be used, trained model parameters, and/or whether model parameter updates reported by a UE will be used or not. At operation 903, a UE sends assistance information to a BS; the assistance information can include information to be used for model inference, which will be described in the "UE assistance information" section. At operation 904, a UE receives a configuration message for a DL RS pattern from a BS. In one example, a configuration message can include an index to a pre-defined lookup table. In another example, a configuration message can include a value for the DL RS density in time and/or frequency.

Figure 10:
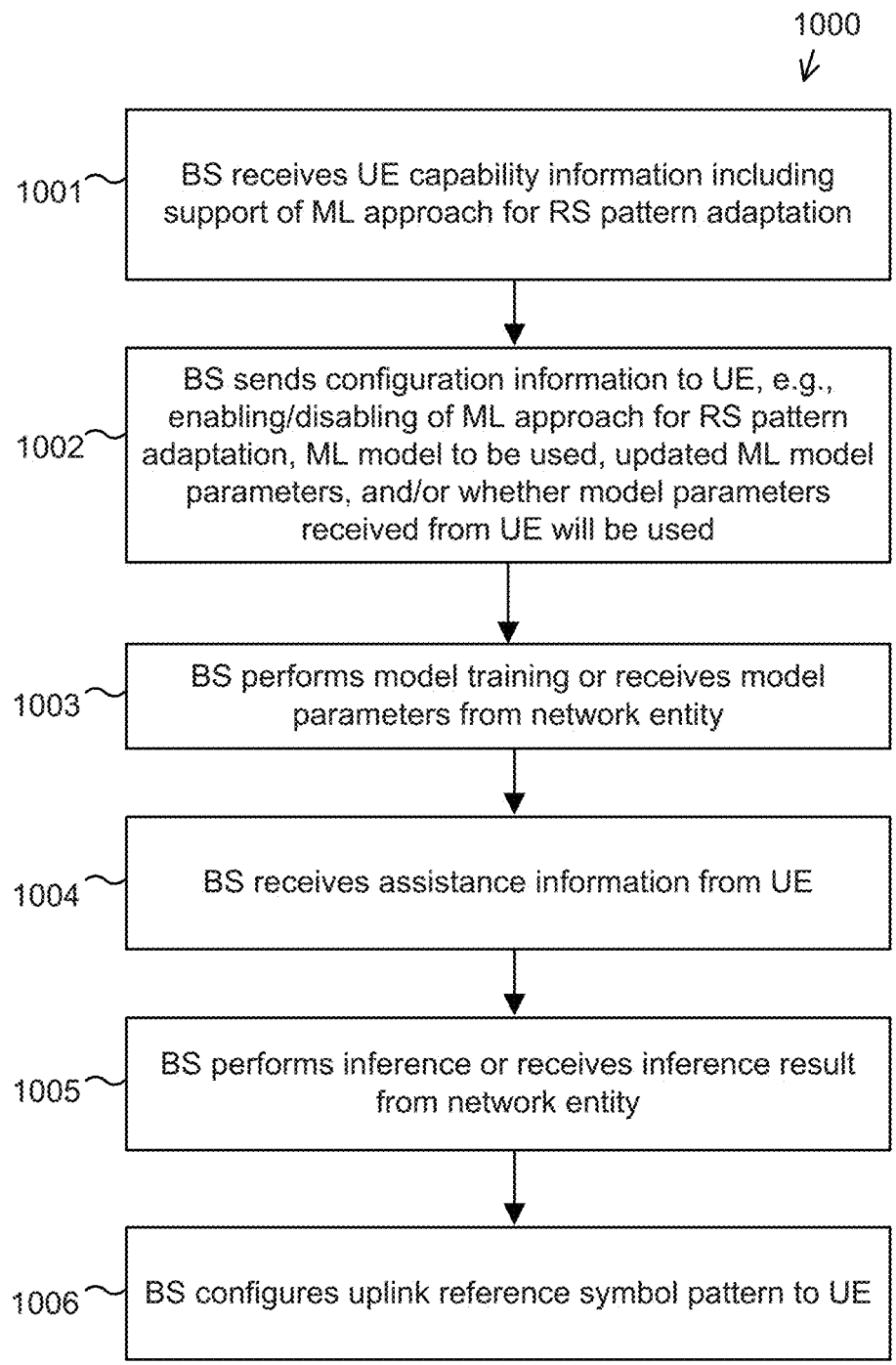
FIG. 10 illustrates a high level flowchart for an example of BS operation to support BS-selected UL RS patterns according to various embodiments of this disclosure.

FIG. 10 illustrates a high level flowchart for an example of BS operation to support BS-selected UL RS patterns according to various embodiments of this disclosure. The embodiment of FIG. 10 is for illustration only. Other embodiments of the process 1000 could be used without departing from the scope of this disclosure.

FIG. 10 is an example of a method 1000 for operations at a BS to support AI/ML techniques for UL RS pattern selection where a BS selects a particular UL RS pattern. At operation 1001, a BS receives UE capability information from a UE, including the support of an ML approach for RS pattern adaptation. At operation 1002, a BS sends configuration information to a UE, which can include ML-related configuration information such as enabling/disabling of an ML approach for RS pattern adaptation, an ML model to be used, trained model parameters, and/or whether model parameter updates reported by a UE will be used or not. At operation 1003, a BS performs model training, or receives model parameters from a network entity. In one embodiment, model training can be performed at a BS. Alternatively, model training can be performed at another network entity (e.g., the O-RAN defined RAN Intelligent Controller), and trained model parameters can be sent to a BS. In yet another embodiment, model training can be performed offline (e.g., model training is performed outside of the network), and the trained model parameters can be sent to a BS or a network entity. At operation 1004, a BS receives assistance information from a UE; the assistance information can include information to be used for model inference, which will be described in the "UE assistance information" section. At operation 1005, a BS performs model inference or receives a model inference result from a network entity. At operation 1006, a BS configures a UL RS pattern to a UE. In one example, a configuration message can include an index to a pre-defined lookup table. In another example, a configuration message can include a value for the UL RS density in time and/or frequency.

Figure 11:
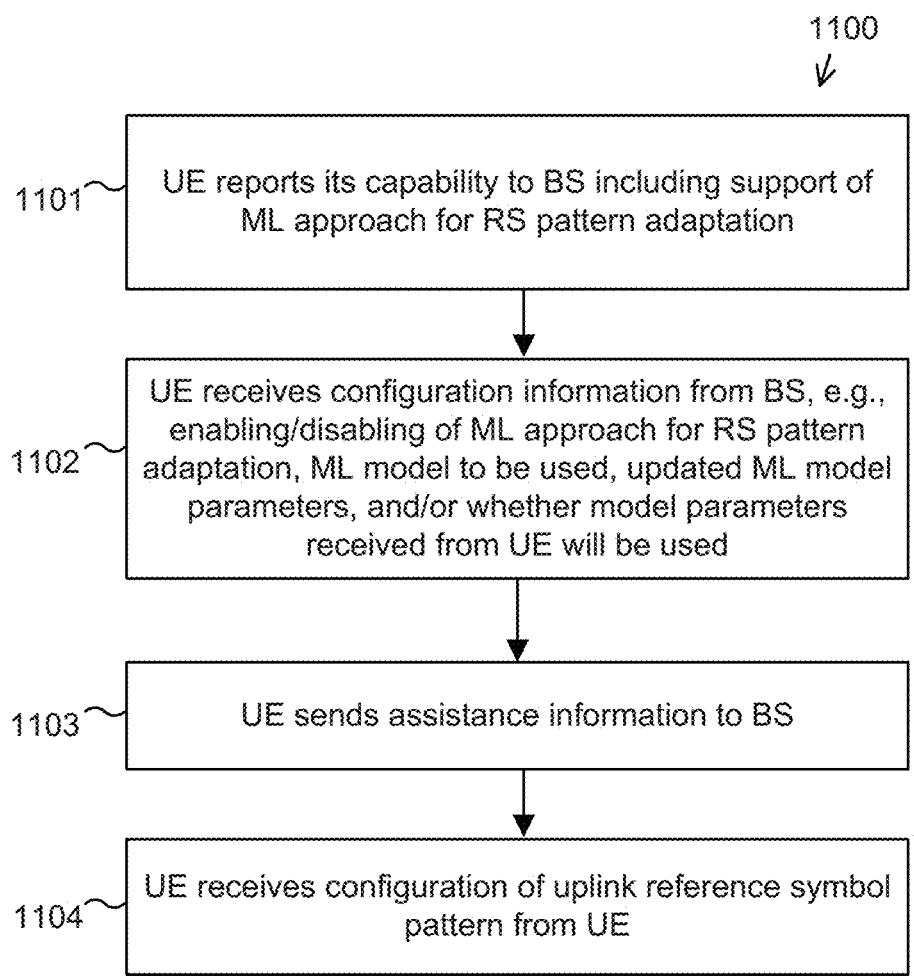
FIG. 11 illustrates a high level flowchart for an example of UE operation to support BS-selected UL RS patterns according to various embodiments of this disclosure.

FIG. 11 illustrates a high level flowchart for an example of UE operation to support BS-selected UL RS patterns according to various embodiments of this disclosure. The embodiment of FIG. 11 is for illustration only. Other embodiments of the process 1100 could be used without departing from the scope of this disclosure.

Figure 12:
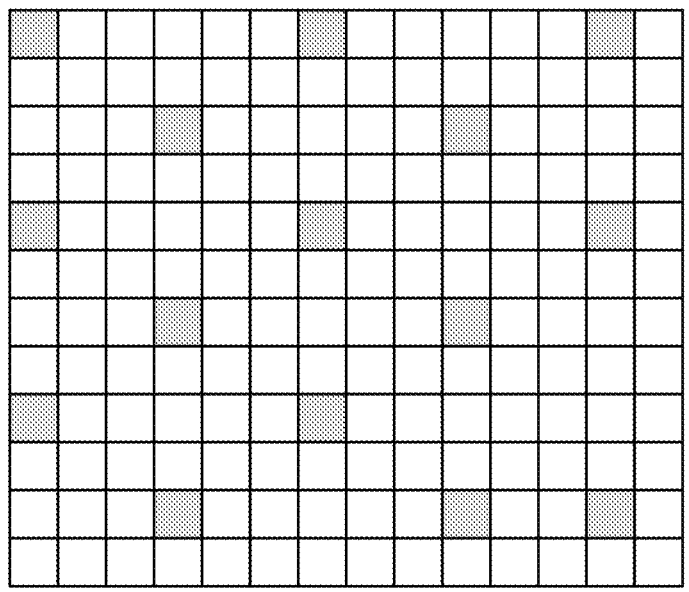
FIG. 12 is an example of a "diamond" RS pattern according to embodiments of this disclosure.

FIG. 11 is an example of a method 1100 for operations at a UE to support AI/ML techniques for UL RS pattern selection where a BS selects a particular UL RS pattern. At operation 1101, a UE reports capability information to a BS, including the support of an ML approach for RS pattern adaptation. At operation 1102, a UE receives configuration information from a BS, which can include ML-related configuration information such as enabling/disabling of an ML approach for RS pattern adaptation, an ML model to be used, trained model parameters, and/or whether model parameter updates reported by a UE will be used or not. At operation 1103, a UE sends assistance information to a BS; the assistance information can include information to be used for model inference, which will be described in the "UE assistance information" section. At operation 1104, a UE receives a configuration message for a UL RS pattern from a BS. In one example, a configuration message can include an index to a pre-defined lookup table. In another example, a configuration message can include a value for the UL RS density in time and/or frequency.

particular subframe. Yet another example of a pre-defined RS pattern is a "diamond" pattern, where RS are evenly spaced in both the time and frequency domains, and the RS subcarriers are offset between consecutive RS symbols. FIG. 12 is an example of a "diamond" pattern, where the shaded squares denote RS symbols/subcarriers.

In one embodiment, a new index for an indicated RS pattern can be defined. For example, when the RS pattern for CSI-RS is to be adapted, the CSI-RS pattern can be indicated with a new index CSI-RS-Pattern-ID. The BS can configure the UE with the CSI-RS-Pattern-ID via RRC configuration. TABLE 1 is an example in Abstract Syntax Notation One (ASN.1) of modifying an information element (IE) Serving-CellConfigCommon to configure the CSI-RS-Pattern-ID, where additional fields that may be added to the Serving-CellConfigCommon IE are indicated in boldface type. In this example, there are maxNrofCsiRsPatterns pre-defined CSI-RS patterns, and the CSI-RS pattern is indicated via an index from 0 to maxNrofCsiRsPatterns−1.

TABLE 1

An example of IE ServingCellConfigCommon modification to configure CSI-RS-Pattern-ID

| ServingCellConfigCommon ::= | SEQUENCE { |
|---|---|
| ... | |
| ssb-periodicityServingCell ms80, ms160, spare2, spare1} | ENUMERATED {ms5, ms10, ms20, ms40, OPTIONAL, -- Need S |
| dmrs-TypeA-Position | ENUMERATED {pos2, pos3}, |
| lte-CRS-ToMatchAround } OPTIONAL, | SetupRelease { RateMatchPatternLTE-CRS |
| csi-rs-pattern-id | INTEGER (0..maxNrofCsiRsPatterns-1), |
| ... | |
| } | |

As another example, when the RS pattern for DMRS is to be adapted, the DMRS pattern can be indicated with a new index DMRS-Pattern-ID. The BS can configure the UE with the DMRS-Pattern-ID via RRC configuration. TABLE 2 is an example of modifying an IE ServingCellConfigCommon to configure the DMRS-Pattern-ID. In this example, there are maxNrofDmrsPatterns pre-defined DMRS patterns, and the DMRS pattern is indicated via an index from 0 to maxNrofDmrsPatterns−1.

TABLE 2

An example of IE ServingCellConfigCommon modification to configure DMRS-Pattern-ID

| ServingCellConfigCommon ::= | SEQUENCE { |
|---|---|
| ... | |
| ssb-periodicityServingCell ms80, ms160, spare2, spare1} | ENUMERATED {ms5, ms10, ms20, ms40, OPTIONAL, -- Need S |
| dmrs-TypeA-Position | ENUMERATED {pos2, pos3}, |
| lte-CRS-ToMatchAround } OPTIONAL, | SetupRelease { RateMatchPatternLTE-CRS |
| dmrs-pattern-id | INTEGER (0..maxNrofDmrsPatterns-1), |
| ... | |
| } | |

The index of an indicated RS pattern can be used to retrieve a pre-defined RS pattern from a lookup table. One example of a pre-defined RS pattern is a "front-loaded" pattern, where RS are placed on all of the subcarriers for only the first OFDM symbol in a particular subframe. Another example of a pre-defined RS pattern is a "pillar" pattern, where RS are only placed on every other subcarrier for only the third and the tenth OFDM symbols in a In another embodiment, a range of values for the density in time and/or frequency of the indicated RS pattern can be defined. For example, when the density in time for CSI-RS is to be adapted, the density in time can be indicated with a new value CSI-RS-Time-Density. The BS can configure the UE with the CSI-RS-Time-Density via RRC configuration. TABLE 3 is an example of modifying an IE ServingCell-ConfigCommon to configure the CSI-RS-Time-Density. In this example, a set of densities in time for the CSI-RS pattern has been pre-defined, and the BS indicates one of these values via the index TD1, TD2, etc.

TABLE 3

An example of IE ServingCellConfigCommon modification to configure CSI-RS-Time-Density

| ServingCellConfigCommon ::= | SEQUENCE { |
|---|---|
| ... | |
| ssb-periodicityServingCell | ENUMERATED {ms5, ms10, ms20, ms40, |
| ms80, ms160, spare2, spare1} | OPTIONAL, -- Need S |
| dmrs-TypeA-Position | ENUMERATED {pos2, pos3}, |
| lte-CRS-ToMatchAround | SetupRelease { RateMatchPatternLTE-CRS |
| } OPTIONAL, | |
| csi-rs-time-density | ENUMERATED (TD1, TD2, ...), |
| ... | |
| } | |

As another example, when the density in frequency for DMRS is to be adapted, density in frequency can be indicated with a new value DMRS-Freq-Density. The BS can configure the UE with the DMRS-Freq-Density via RRC configuration. TABLE 4 is an example of modifying an IE ServingCellConfigCommon to configure the DMRS-Freq-Density. In this example, a set of densities in frequency for the DMRS pattern has been pre-defined, and the BS indicates one of these values via the index FD1, FD2, etc.

TABLE 4

An example of IE ServingCellConfigCommon modification to configure DMRS-Freq-Density

| ServingCellConfigCommon ::= | SEQUENCE { |
|---|---|
| ... | |
| ssb-periodicityServingCell | ENUMERATED {ms5, ms10, ms20, ms40, |
| ms80, ms160, spare2, spare1} | OPTIONAL, -- Need S |
| dmrs-TypeA-Position | ENUMERATED {pos2, pos3}, |
| lte-CRS-ToMatchAround | SetupRelease { RateMatchPatternLTE-CRS |
| } OPTIONAL, | |
| dmrs-freq-density | ENUMERATED (FD1, FD2, ...), |
| ... | |
| } | |

The UE assistance information related to AI/ML techniques for DL/UL RS pattern selection (e.g., at operations 804, 903, 1004 or 1103) can include one or multiple of the following information available at the UE: UE location, UE trajectory, estimated DL channel delay spread, estimated DL channel Doppler spread, etc. The assistance information can be used for model inference, e.g., when inference is performed at the BS or a network entity. Alternatively, the assistance information can include the model inference result if inference is performed at the UE.

The UE assistance information can be reported via the PUCCH and/or the PUSCH. A new UCI type, a new PUCCH format and/or a new MAC CE can be defined for the UE assistance information report.

In one embodiment, the UE assistance information report can be triggered periodically, e.g., via UE-specific RRC signaling. In another embodiment, the UE assistance information report can be semi-persistent or aperiodic. For example, the UE assistance information report can be triggered by the DCI, where a new field (e.g., 1-bit triggering field) can be introduced to the DCI for report triggering. In one example, an IE similar to the CSI-ReportConfig IE can be introduced for configuring the UE assistance information report to support AI/ML techniques for DL/UL RS pattern selection.

TABLE 5 provides an example of the IE for configuring the UE assistance information report, where whether the report is periodic or semi-persistent or aperiodic, the resources for the report transmission, and/or report contents can be included. For the 'UE-location', a set of UE locations are predefined in this example; the UE can report one of these locations via the index L1, L2, etc. However, other methods for reporting the UE location are not excluded. For the 'UE-trajectory', a set of UE trajectories are predefined in this example; the UE can report one of these trajectories via the index T1, T2, etc. However, other methods for reporting the UE trajectory are not excluded.

TABLE 5

An example of IE for configuration of UE assistance information report
for support of AI/ML techniques for DL/UL RS pattern selection

```
MlRsReport-ReportConfig ::=          SEQUENCE {
  reportConfigId                     MlRsReport-ReportConfigId,
  reportConfigType                   CHOICE {
    periodic                         SEQUENCE {
      reportSlotConfig               MlRsReport-
        ReportPeriodicityAndOffset,
      pucch-MlRsReport-ResourceList  SEQUENCE        (SIZE
        (1..maxNrofBWPs)) OF PUCCH-MlRsReport-Resource
    },
    semiPersistentOnPUCCH            SEQUENCE {
      reportSlotConfig               MlRsReport-
        ReportPeriodicityAndOffset,
      pucch-MlRsReport-ResourceList  SEQUENCE        (SIZE
        (1..maxNrofBWPs)) OF PUCCH-MlRsReport-Resource
    },
    semiPersistentOnPUSCH            SEQUENCE {
      reportSlotConfig               ENUMERATED {sl5, sl10, sl20,
        sl40, sl80, sl160, sl320},
      reportSlotOffsetList           SEQUENCE (SIZE       (1..
        maxNrofUL-Allocations)) OF INTEGER(0..32),
      p0alpha                        P0-PUSCH-AlphaSetId
    },
    aperiodic                        SEQUENCE {
      reportSlotOffsetList           SEQUENCE        (SIZE
        (1..maxNrofUL-Allocations)) OF INTEGER (0..32)
    }
  },
  reportQuantity                     CHOICE {
    none                             NULL,
    UE-location                      ENUMERATED {L1, L2, ...}
    UE-trajectory                    ENUMERATED {T1, T2, ...}
    ...
  },
MlRsReport-ReportPeriodicityAndOffset ::= CHOICE {
  slots4                             INTEGER(0..3),
  slots5                             INTEGER(0..4),
  slots8                             INTEGER(0..7),
  slots10                            INTEGER(0..9),
  slots16                            INTEGER(0..15),
  slots20                            INTEGER(0..19),
  slots40                            INTEGER(0..39),
  slots80                            INTEGER(0..79),
  slots160                           INTEGER(0..159),
  slots320                           INTEGER(0..319)
}
PUCCH-mlRsReport-Resource ::=        SEQUENCE {
  uplinkBandwidthPartId              BWP-Id,
  pucch-Resource                     PUCCH-ResourceId
}
...
}
```

Figure 13:
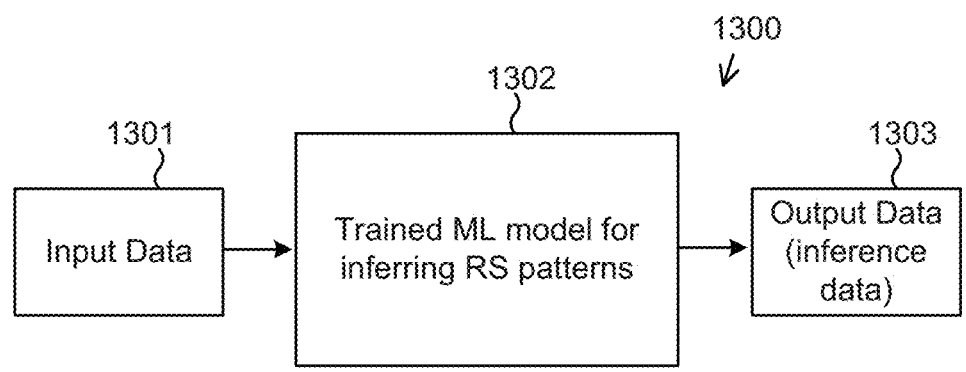
FIG. 13 illustrates a high level block diagram for an example of using a trained ML model to infer an RS pattern according to various embodiments of this disclosure.

FIG. 13 illustrates a high level block diagram for an example of using a trained ML model to infer an RS pattern according to various embodiments of this disclosure. The embodiment of FIG. 13 is for illustration only. Other embodiments of the process 1300 could be used without departing from the scope of this disclosure.

FIG. 13 is an example of an apparatus 1300 to infer an RS pattern using a trained ML model 1302. The input data 1301 for the trained ML model may include the following:

Coherence bandwidth of underlying wireless channel

Coherence time of underlying wireless channel

Delay spread of underlying wireless channel

Doppler spread of underlying wireless channel

RRM metrics

UE location

UE speed

UE trajectory

The output data 1303 for the trained ML model may include the following:

Density in time for an RS pattern

Density in frequency for an RS pattern

Index of an RS pattern in a pre-defined lookup table

The inferred RS pattern may depend on the contents of the UE assistance information report. In one example, the UE may indicate that the user is entering a train; in this case, the underlying wireless channel may vary more rapidly in time, and the trained ML model may infer an RS pattern with an increased density in time. In another example, the UE may indicate that it is entering a building; in this case, the underlying wireless channel may vary less rapidly in frequency, and the trained ML model may infer an RS pattern with a reduced density in frequency.

Figure 14:
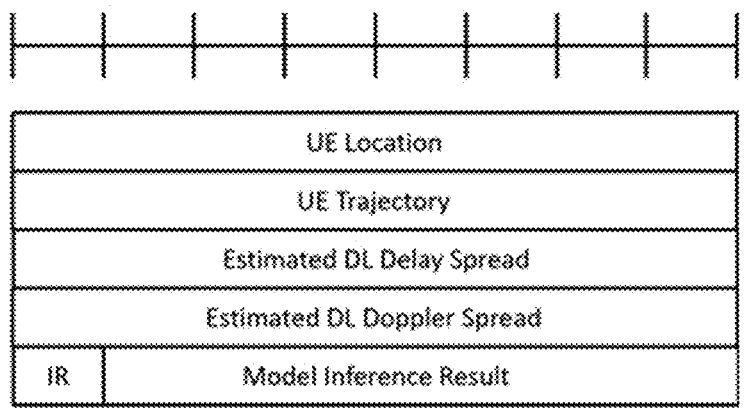
FIG. 14 illustrates an example of a new MAC CE for the UE assistance information report according to various embodiments of this disclosure.

FIG. 14 illustrates an example of a new MAC CE for the UE assistance information report according to various embodiments of this disclosure. In one embodiment, a new MAC CE can be defined for the UE assistance information report. This MAC CE can be identified by a MAC subheader with a logical channel ID (LCD) that can be specified in Table 6.2.1-2 in [4]. This MAC CE can have a variable size and consist of the following fields:

UE Location: This field indicates the position of the UE in a pre-defined coordinate system, e.g., the Earth-Centered Earth-Fixed (ECEF) coordinate system.

UE Trajectory: This field indicates the heading of the UE in a pre-defined coordinate system, e.g., the Earth-Centered Earth-Fixed (ECEF) coordinate system.

Estimated DL Delay Spread: This field indicates the UE's estimate of the DL channel's delay spread in nanoseconds.

Estimated DL Doppler Spread: This field indicates the UE's estimate of the DL channel's Doppler spread in Hertz.

IR: This field indicates the presence of the octet containing the Model Inference Result field. If the IR field is set to 1, the octet containing the Model Inference Result field is present. If the IR field is set to 0, the octet containing the Model Inference Result field is not present.

Model Inference Result: This field indicates the result of ML model inference at the UE. In one example, this field can include a recommendation for a DL RS pattern index. In another example, this field can include a recommendation for an UL RS pattern density in the frequency domain.

FIG. 14 shows an example of a new MAC CE for the UE assistance information report, where the UE Location, UE Trajectory, Estimated DL Delay Spread, and Estimated DL Doppler Spread fields each have a length of 8 bits; the Model Inference Result field has a length of 7 bits.

Multiple-input multiple-output (MIMO) signaling is widely regarded as one of the key techniques in the cellular wireless communication system. One component of a MIMO transmission scheme is the channel state information (CSI) acquisition at the base station or gNodeB (gNB). For multiple user MIMO (MU-MIMO), in particular, the availability of accurate CSI is necessary in order to guarantee high MU performance. In frequency division duplex (FDD) systems, the CSI is acquired using the CSI reference signal (CSI-RS) transmission from gNB, and CSI calculation and feedback from mobile station or user equipment (UE).

The traditional CSI feedback framework is 'implicit' in the form of three components: pre-coding matrix indicator (PMI), rank indicator (RI), and channel quality indicator (CQI). The UE derives these components using downlink (DL) channel estimates assuming a single-user (SU) transmission in effect. The PMI feedback corresponds to DL channel eigenvectors along which DL channel strengths are strong and it is the index to an element in the pre-coding matrix codebook as defined in 3GPP. The strength of the channel is fed back in the form of CQI and the number of dominant eigenvectors is indicated by RI.

Because of the inherent SU assumption while deriving CSI, this implicit CSI feedback is inadequate for MU transmission. 3GPP provided specification support to high-resolution CSI reporting in Rel. 14 LTE based on a linear combination (LC) codebook called 'advanced CSI codebook' However, the overhead (number of bits) to report high-resolution CSI can be large. In 5G NR, Type II CSI codebook is introduced that reduces the feedback overhead by exploiting correlation in both spatial and frequency domains.

In the conventional cellular system, the CSI codebook scheme is defined by specification and applied universally to all the UEs and cells in the system. Although there is configurability such as different types of codebook, i.e., Type-I or Type-II codebook, or number of DFT beams for Type-II codebook in NR, the flexibility for configuring or downloading CSI codebook site-specifically or UE-specifically does not exist.

In comparison between urban and rural areas, as an example, the channel statistics can be quite different and the optimal set of codebook can be different. In urban area, effective BS beam directions can be confined horizontally and/or vertically due to various blockages, while in rural area, it may be preferable that the BS beam direction covers wide areas and directions. Generally defined CSI codebook assumes covering wide beam directions and thereby the beam direction that can be represented by each codebook maybe coarsely quantized. While limiting the overall CSI feedback overhead, the beam directions represented by a set of codebook can be more fine granular, if codebook can be downloadable/configurable UE/site-specifically.

Techniques, apparatus and methods are disclosed for the support of Downloadable UE/site-specific codebook for MIMO systems, specifically the methods for configuring/updating UE or site-specific codebook and reference signals including handover cases, support of default codebook and fallback mechanism to default codebook, methods for PMI-based downloadable codebook, methods for two-stage PMI-based downloadable codebook, and the methods for UE or site-specific linear combination codebook. The disclosed techniques, apparatus and methods can be applied generally to MIMO systems, including any variants of MIMO systems such as massive MIMO, distributed MIMO and also either fully-digital or hybrid beamforming MIMO systems.

The disclosed designs below can be generally applicable to any MIMO systems. The examples in this disclosure should be considered in inclusive manner, without exclusion of other wireless communication systems. For example, the disclosed methods can be applied to both LTE and NR, Wi-Fi or any future or existing communication systems.

Figure 15:
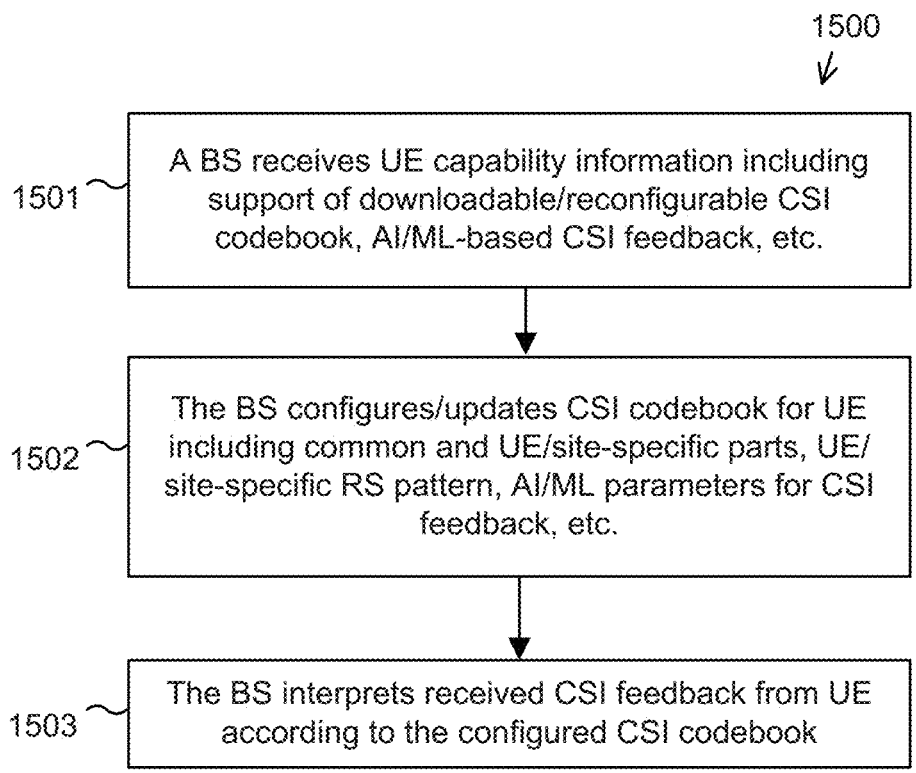
FIG. 15 illustrates a high level flowchart for configuring/updating CSI codebook and reference signals UE or site-specifically from network perspective according to various embodiments of this disclosure.

FIG. 15 illustrates a high level flowchart for configuring/updating CSI codebook and reference signals UE or site-specifically from network perspective according to various embodiments of this disclosure. The embodiment of FIG. 15 is for illustration only. Other embodiments of the process 1500 could be used without departing from the scope of this disclosure.

FIG. 15 illustrates an embodiment of this disclosure in which the CSI codebook and reference signals can be UE or site-specifically downloaded or configured to UE. For instance, PMI codebook set or parameters for LC codebook can be downloaded to UE, which will be disclosed in more details in later embodiments. In another embodiment, the CSI codebook can be AWL-based method of compressing CSI at the UE and recovering at the BS. One example is autoencoder based CSI compression and recovery. In such an example, the BS and UE may use paired neural network and trained neural network parameters, such as weights. In such an example, the neural network model and associated parameters can be subject to UE or site-specific download/configuration. The method 1400 is described from network perspective. At operation 1501, a BS receives UE capability information including support of downloadable/reconfigurable CSI codebook, AWL-based CSI feedback, etc. At operation 1502, the BS configures/updates CSI codebook for UE including common and UE/site-specific parts, UE/site-specific RS pattern, AI/ML parameters for CSI feedback, etc. The codebook can be entirely downloadable/configurable UE or site-specifically, or there can be common codebook assumed by UE, e.g., by specification, and there can be other parts which are UE or site-specifically downloadable/configurable, to be discussed in more details in a later embodiment. At operation 1503, the BS interprets received CSI feedback from UE according to the configured CSI codebook.

Figure 16:
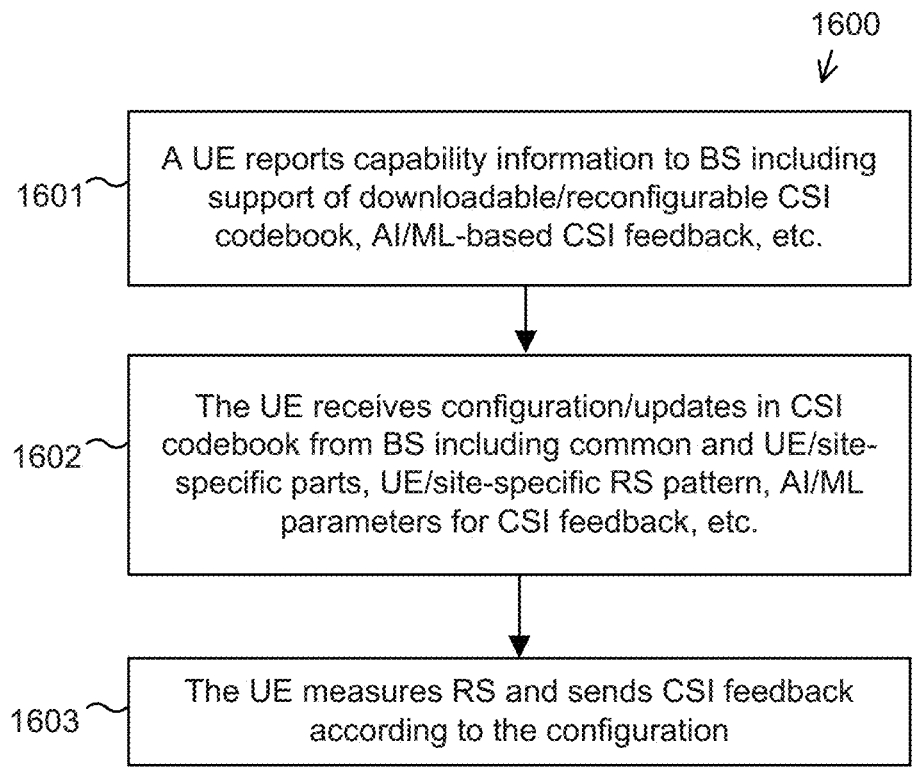
FIG. 16 illustrates a high level flowchart for configuring/updating CSI codebook and reference signals UE or site-specifically from UE perspective according to various embodiments of this disclosure.

FIG. 16 illustrates a high level flowchart for configuring/updating CSI codebook and reference signals UE or site-specifically from UE perspective according to various embodiments of this disclosure. The embodiment of FIG. 16 is for illustration only. Other embodiments of the process 1600 could be used without departing from the scope of this disclosure.

The method 1600 is described from UE perspective. At operation 1601, a UE reports capability information to BS including support of downloadable/reconfigurable CSI codebook, AWL-based CSI feedback, etc. At operation 1602, the UE receives configuration/updates in CSI codebook from BS including common and UE/site-specific parts, UE/site-specific RS pattern, AI/ML parameters for CSI feedback, etc. At operation 1603, the UE measures RS and sends CSI feedback according to the configuration. The CSI codebook downloading/configuration can be part of initial access procedure, part of handover procedure via RRC reconfiguration, or updates while being connected to serving cell. One example is that the UE is moving within the coverage of the serving cell, and the codebook can be downloaded/configured site-specifically. Exemplary BS and UE operations to configure CSI codebook and parameters during the handover are provided in a later part of this disclosure.

In the case of UE-specific codebook, the codebook can be configured to UE using a UE-specific signaling method, e.g., RRC signaling. Using UE-specific signaling, for example, the UE can be configured with a particular set of PMI matrices, a beam confinement for LC codebook, etc. In the case of AI-based CSI feedback, the UE can be configured with a used AI model and related parameters through UE-specific signaling. The UE-specific codebook can be reconfigured, for instance, when the UE performs handover.

In the case of site-specific codebook, the codebook configuration is applied commonly to UEs in a cell or a group of cells. A common signaling method can be used such as cell common or group common signaling. A UE can be also configured with a set of cell IDs, which defines 'site' wherein common CSI codebook configuration is assumed to be applied. UEs in the cell or in the group of cells will apply common PMI matrix set, beam confinement for LC codebook, or AI model and parameters, as an example. As long as the UE performs handover within the cell group, the UE assumes that the previously configured codebook is valid unless otherwise configured.

Figure 17:
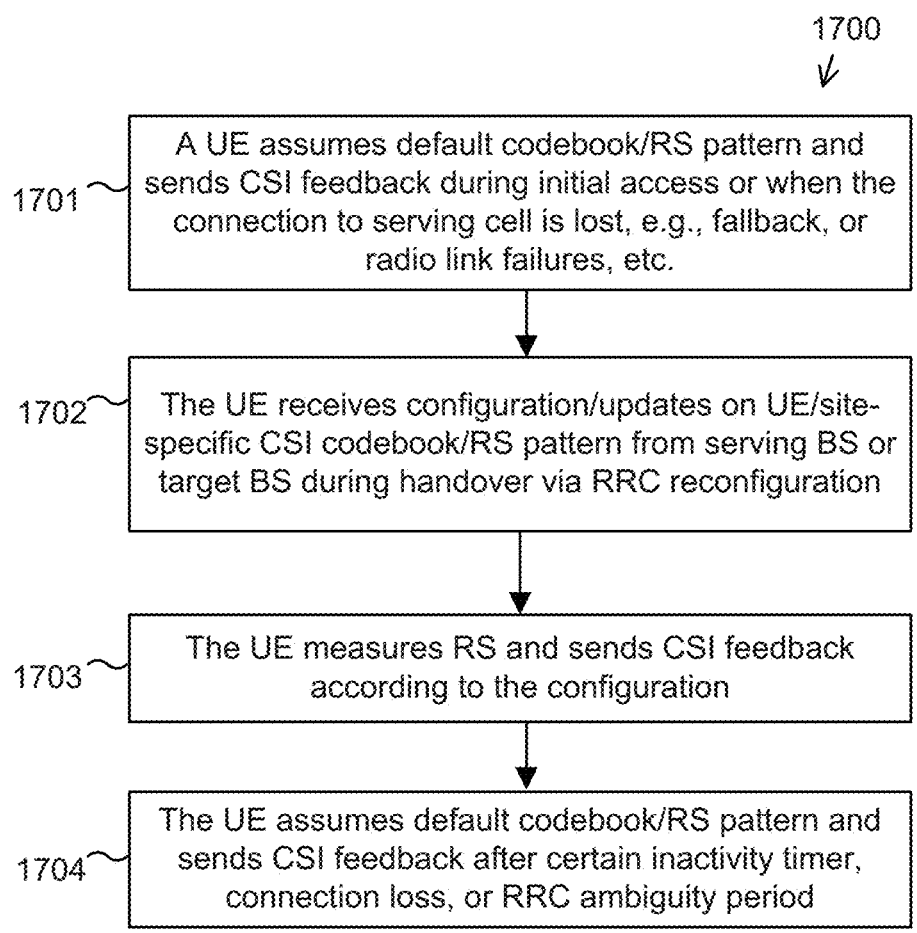
FIG. 17 illustrates a high level flowchart illustrating UE operation for fallback to default CSI codebook according to various embodiments of this disclosure.

FIG. 17 illustrates a high level flowchart illustrating UE operation for fallback to default CSI codebook according to various embodiments of this disclosure. The embodiment of FIG. 17 is for illustration only. Other embodiments of the process 1700 could be used without departing from the scope of this disclosure.

FIG. 17 and method 1700 depict UE operation of assuming default CSI codebook and/or RS pattern and fallback mechanism. At operation 1701, the UE assumes default CSI codebook and/or RS pattern during initial access or for the case when the connection to serving cell is lost such as for the case of radio link failure, etc. At operation 1702, the UE receives configuration/updates on UE or site-specific CSI codebook and/or RS pattern from serving BS or from target BS during handover via RRC reconfiguration. As previously disclosed, the UE can also receive updated codebook while connected to the serving BS. At operation 1703, in one embodiment, the UE can indicate whether the reporting is based on default codebook or UE/site-specifically configured codebook in the CSI report message. At operation 1704, after being configured with UE or site-specific codebook, the UE may fallback to default CSI codebook and/or RS pattern after certain inactivity timer, connection loss, or RRC ambiguity period during RRC reconfiguration.

Figure 18:
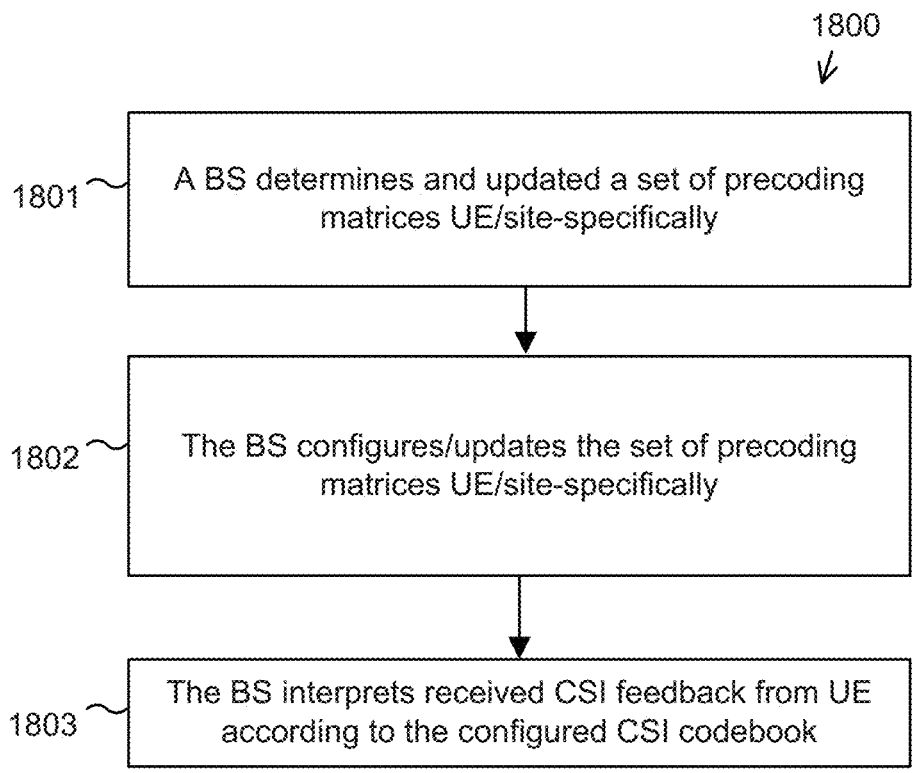
FIG. 18 illustrates a high level flowchart illustrating use of a PMI-based downloadable codebook from network perspective according to various embodiments of this disclosure.

FIG. 18 illustrates a high level flowchart illustrating use of a PMI-based downloadable codebook from network perspective according to various embodiments of this disclosure. The embodiment of FIG. 18 is for illustration only. Other embodiments of the process 1800 could be used without departing from the scope of this disclosure.

Figure 19:
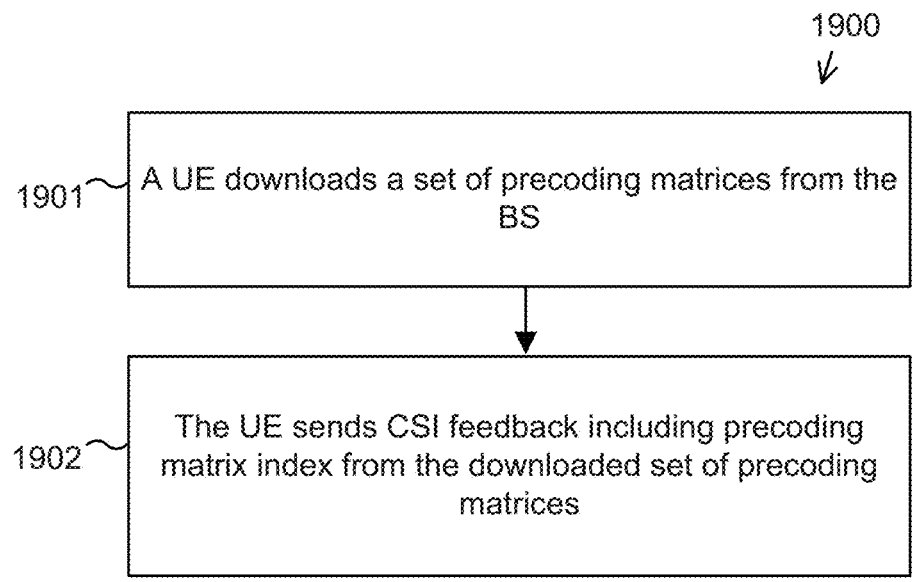
FIG. 19 illustrates a high level flowchart illustrating use of a PMI-based downloadable codebook from UE perspective according to various embodiments of this disclosure.

The method 1800 is described from network perspective. At operations 1801 and 1802, the BS determines and updates a set of precoding matrices UE-specifically or site-specifically and configures those precoding matrices to the UE accordingly. At operation 1803, the BS interprets received CSI feedback from UE according to the configured CSI codebook. In one embodiment, a set of precoding matrices can be indicated as an index from a predefined superset of sets. In one example, each set contains basis matrices for subspaces over N-dimensional space, where N is the size of antenna ports. In another example, each set contains matrices composed of array-steering vectors with predefined quantized angles. In another embodiment, a set can be indicated with a set of indices, each indicating a precoding matrix from a predefined set. In yet another embodiment, entire precoding matrices can be encoded and directly sent to UEs FIG. 19 illustrates a high level flowchart illustrating use of a PMI-based downloadable codebook from UE perspective according to various embodiments of this disclosure. The embodiment of FIG. 19 is for illustration only. Other embodiments of the process 1900 could be used without departing from the scope of this disclosure.

The method 1900 is described from the UE perspective, and is a counterpart to method 1800. At operation 1901, the UE downloads a set of precoding matrices from the BS. At operation 1902, the UE sends CSI feedback including precoding matrix index from the downloaded set of precoding matrices.

Figure 20:
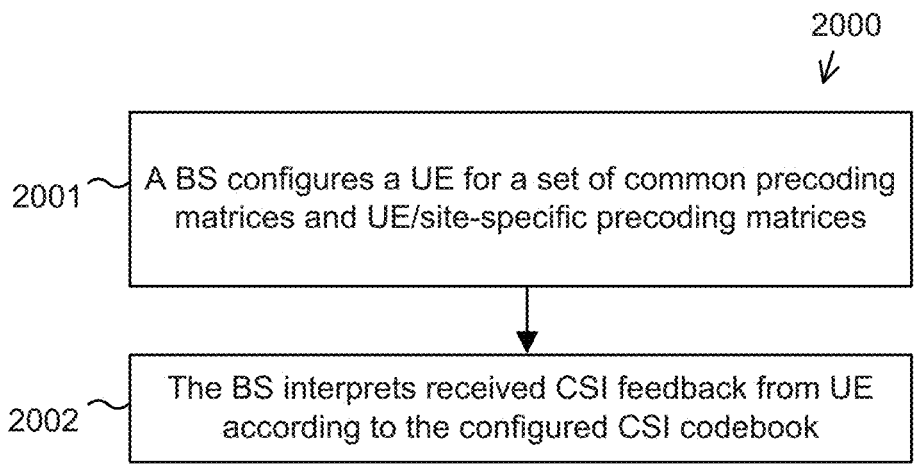
FIG. 20 illustrates a high level flowchart illustrating use of a two-stage PMI-based downloadable codebook from network perspective according to various embodiments of this disclosure.

FIG. 20 illustrates a high level flowchart illustrating use of a two-stage PMI-based downloadable codebook from network perspective according to various embodiments of this disclosure. The embodiment of FIG. 20 is for illustration only. Other embodiments of the process 2000 could be used without departing from the scope of this disclosure.

FIG. 20 illustrates the method of two-stage PMI-based downloadable codebook from network perspective. In this embodiment, the codebook comprises of a set of common precoding matrices and a set of UE/site-specific precoding matrices. At operation 2001, a BS configures a UE for a set of common precoding matrices and UE/site-specific precoding matrices. At operation 2002, the BS interprets received CSI feedback from UE according to the configured CSI codebook. As an example, the common precoding matrices can be defined by coarsely quantized beam directions, and the precoding matrix chosen from the set of common precoding matrices can be multiplied by second precoding matrix chosen from the UE/site-specifically defined fine granular codebook. Therefore, the final representation of the codebook can include a product of the PMI chosen from common precoding matrices and the PMI chosen from UE/site-specific precoding matrices. In another example, a first stage precoding matrix is selected from a set of precoding matrices defined in a site-specific manner and a second stage precoding matrix is selected from a set of precoding matrices in a UE-specific manner. In one example, a set of NW-specific precoding matrices for a first stage precoding matrix is indicated to UE from NW. In another example, a set of UE-specific precoding matrices for a second stage precoding matrix is reported by UE to NW. In such a case, NW can configure UE to report a set of UE-specific precoding matrices for a second stage precoding matrix.

Figure 21:
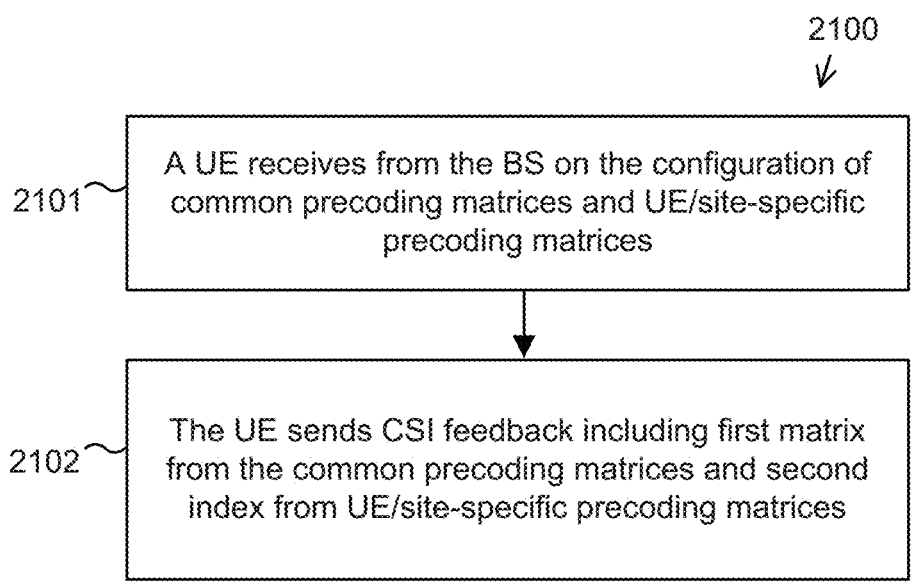
FIG. 21 illustrates a high level flowchart illustrating use of a two-stage PMI-based downloadable codebook from UE perspective according to various embodiments of this disclosure.

FIG. 21 illustrates a high level flowchart illustrating use of a two-stage PMI-based downloadable codebook from UE perspective according to various embodiments of this disclosure. The embodiment of FIG. 21 is for illustration only. Other embodiments of the process 2100 could be used without departing from the scope of this disclosure.

The method 2100 is described from UE perspective, and is a counterpart to method 2000. At operation 2101, a UE receives from the BS on the configuration of common precoding matrices and UE/site-specific precoding matrices. At operation 2102, the UE sends CSI feedback including first matrix from the common precoding matrices and second index from UE/site-specific precoding matrices. In two-stage PMI-based CSI feedback, the UE reports to precoding matrix indices as described at operation 2102, that is, one from common precoding matrices and the other one from UE/site-specific precoding matrices.

Figure 22:
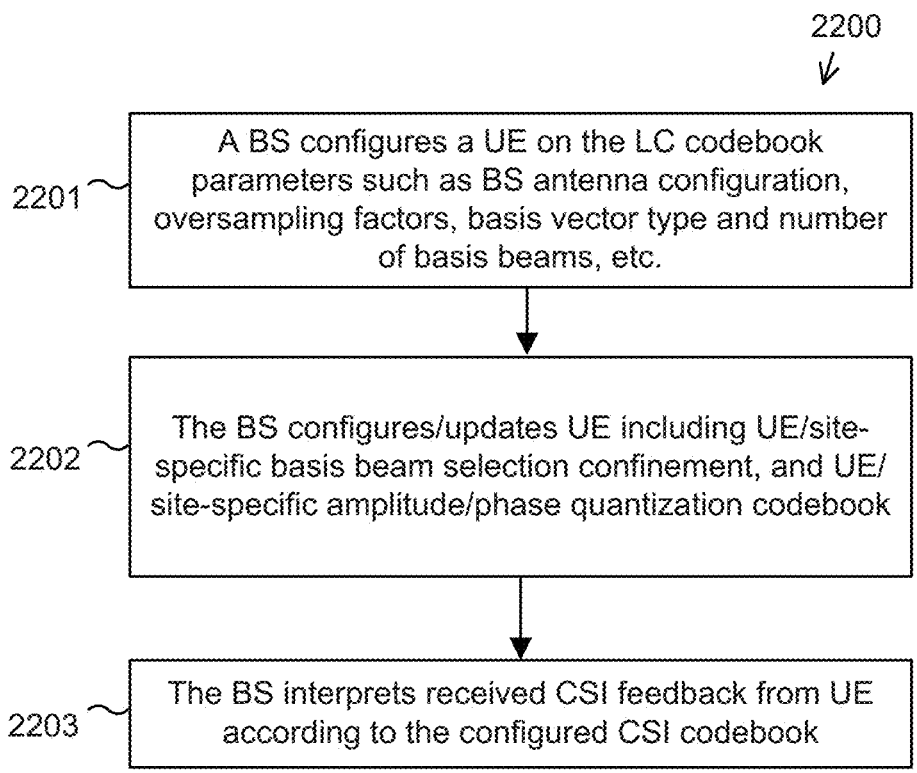
FIG. 22 illustrates a high level flowchart illustrating linear combination codebook-based downloadable codebook from network perspective according to various embodiments of this disclosure.

FIG. 22 illustrates a high level flowchart illustrating linear combination codebook-based downloadable codebook from network perspective according to various embodiments of this disclosure. The embodiment of FIG. 22 is for illustration only. Other embodiments of the process 2200 could be used without departing from the scope of this disclosure.

FIG. 22 illustrates the method of linear combination codebook-based downloadable codebook. The method 2200 is described from network perspective. At operation 2201, the BS configures a UE on the LC codebook parameters such as BS antenna configuration, oversampling factor, basis vector type and the number of basis beams. The basis vector type can be for example discrete Fourier transform (DFT)-based or range-based beam vectors. Any other types of basis vectors such as AI-based basis vector set creation can be possible. At operation 2202, the BS configures/updates UE including UE/site-specific basis beam selection confinement and/or UE/site-specific amplitude/phase codebook. At operation 2203, the BS interprets received CSI feedback from UE according to the configured CSI codebook. As an example, the BS may configure its antenna size in two dimensions (2-D), i.e., N1, N2, to UEs along with oversampling factor along the same dimension, i.e., O1 and O2, and optionally the size of subbands (SBs), i.e., N3 along with the oversampling factor O3. Consequently, the oversampled beam space comprises of N1*O1 by N2*O2 size matrix. This oversampled beam space assumes equal spacing quantization of beam space in horizontal and vertical axes. In certain BS location, e.g., due to blockage, the valid beam space can be confined within the N1*O1 by N2*O2 size space. In one embodiment, the BS configures basis beam selection confinement within the entire beam space UE or site specifically. As an example, the BS may indicate the valid beam selection index range horizontally and vertically, as a subset of N1*O1 by N2*O2 size space. With such beam selection confinement, the BS may configure higher over-sampling factors to quantize the beam space with more-fine granularity while not increasing the feedback overhead due to the beam space confinement. In another embodiment, the amplitude and phase codebook can be UE or site-specifically configured. The amplitude codebook may be equal-distance quantized in log scale and the phase codebook is also equally quantized from 0 to $2\pi$ degree. In certain cases, the meaningful feedback values may occur only from certain range of amplitude and phase values. In such a case, the BS may confine the range of amplitude and phase feedback values and thereby, more fine granular quantization can be possible with the confined range of values while not increasing the feedback overhead. In one example, a consecutive of elements for the amplitude/phase codebooks are indicated to the UE for confining a range of values. For example, starting and last elements of a confined range of values are indicated to UE. In another example, a starting element and a length are indicated to UE. In one example, confining range of values is signaled via DCI (or MAC-CE/RRC). In another embodiment, a second set of phase and amplitude codebooks in addition to a first set of phase and amplitude codebooks for reporting coefficient values corresponding to basis vectors are pre-defined for constructing a set of basis vectors and NW constructs a set of basis vectors using the second set of phase and amplitude codebooks, for example, depending on site-specific/UE-specific channel environments. In one example, NW periodically configures/updates a set of basis vectors constructed from a second set of phase and amplitude codebooks to UE and the UE selects basis vectors from the configured set of basis vectors when CSI-RSs are configured to report CSI during the periodic interval. In another example, NW dynamically/semi-persistently configures/updates a set of basis vectors constructed from a second set of phase and amplitude codebooks to UE. In one example, constructing a set of basis vectors from a second set of phase and amplitude codebooks is signaled via RRC (or MAC-CE/DCI). In one example, the unit-norm property of basis vector is considered to reduce indication overhead for configuring/updating a set of basis vectors. In one example, the last entry of amplitudes in each basis vector is not indicated since it can be computed by the unit-norm property.

Figure 23:
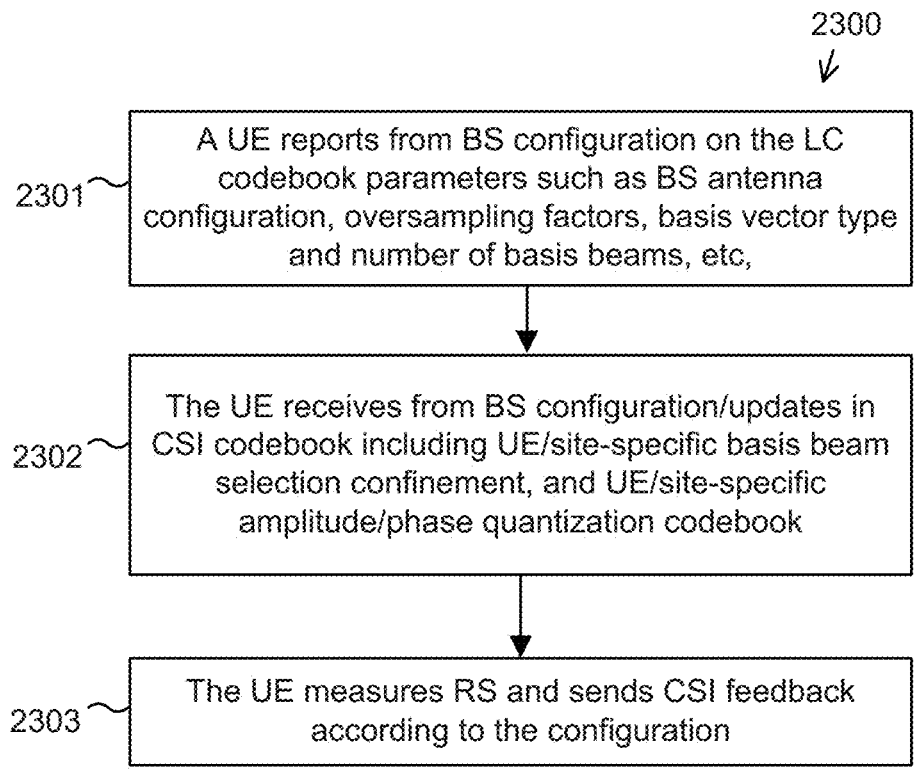
FIG. 23 illustrates a high level flowchart illustrating linear combination codebook-based downloadable codebook from UE perspective according to various embodiments of this disclosure.

FIG. 23 illustrates a high level flowchart illustrating linear combination codebook-based downloadable codebook from UE perspective according to various embodiments of this disclosure. The embodiment of FIG. 23 is for illustration only. Other embodiments of the process 2300 could be used without departing from the scope of this disclosure.

FIG. 23 illustrates the method of linear combination codebook-based downloadable codebook. The method 2300 is described from network perspective. At operation 2301, a UE reports from BS configuration on the LC codebook parameters such as BS antenna configuration, oversampling factors, basis vector type and number of basis beams, etc. At operation 2302, the UE receives from BS configuration/updates in CSI codebook including UE/site-specific basis beam selection confinement, and UE/site-specific amplitude/phase quantization codebook. At operation, 2303, the UE measures RS and sends CSI feedback according to the configuration.

Another embodiment of the disclosure relates to a scenario that a handover to the neighbor cell has to be performed for the UE, for example, when the UE moves out of the serving cell area and into a neighbor cell area. During handovers, the new configuration information to apply in the target BS area may be provided to the UE. As the target BS can have different configurations from the source BS, e.g., antenna configuration and structure, trained AI/ML parameters, optimal RS patters, the UE may receive different parameter values and configurations than the ones applied for the current serving cell.

Figure 24:
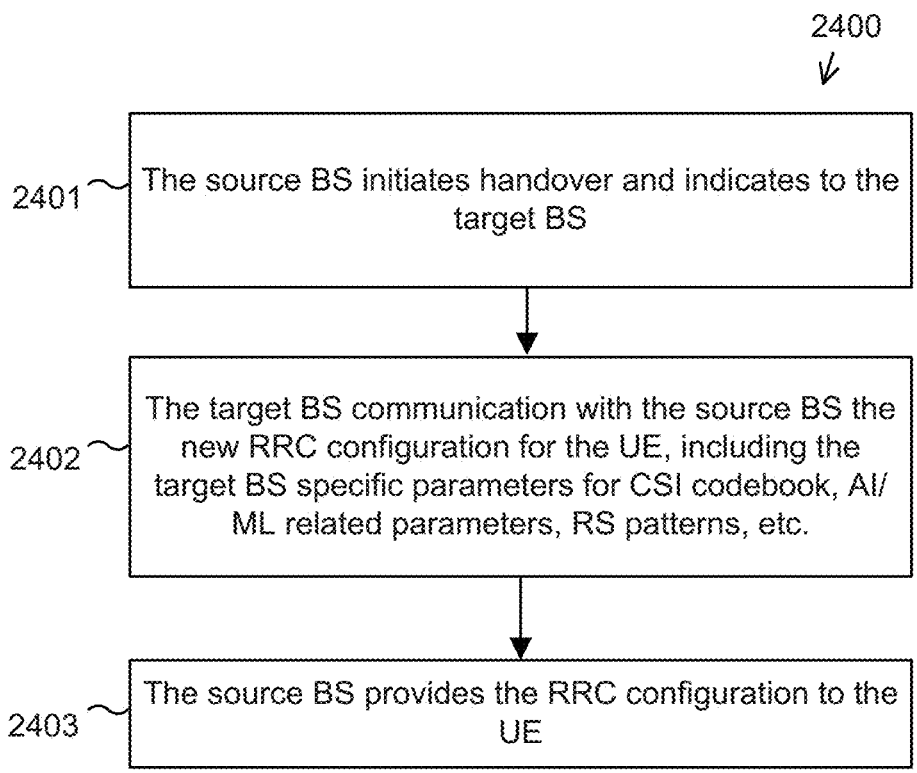
FIG. 24 illustrates a high level flowchart illustrating the update of the configuration parameters during handover from network perspective according to various embodiments of this disclosure.

FIG. 24 illustrates a high level flowchart illustrating the update of the configuration parameters during handover from network perspective according to various embodiments of this disclosure. The embodiment of FIG. 24 is for illustration only. Other embodiments of the process 2400 could be used without departing from the scope of this disclosure.

At operation 2401, the source BS initiates handover and indicates to the target BS through a communication means, e.g., messages over the Xn interface. At operation 2402, the target BS communicates with the source BS the new RRC configuration for the UE, which may include the target BS specific parameters for CSI codebook, AI/ML related parameters, RS patterns, etc. within the messages over the Xn interface. At operation 2403, the source BS provides the RRC configuration to the UE.

Figure 25:
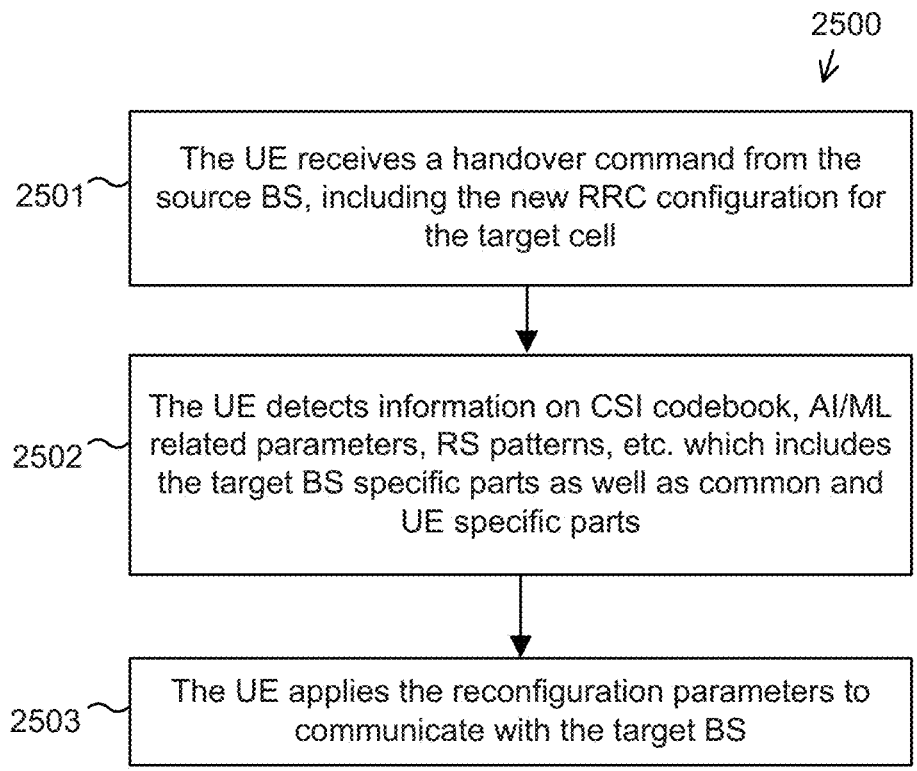
FIG. 25 illustrates a high level flowchart illustrating the update of the configuration parameters during handover from UE perspective according to various embodiments of this disclosure.

FIG. 25 illustrates a high level flowchart illustrating the update of the configuration parameters during handover from UE perspective according to various embodiments of this disclosure. The embodiment of FIG. 25 is for illustration only. Other embodiments of the process 2500 could be used without departing from the scope of this disclosure.

At operation 2501, the UE receives a handover command from the source BS, which may include the new RRC configuration for the target cell. At operation 2502, from the new RRC configuration the UE detects information on CSI codebook, AI/ML related parameters, RS patterns, etc., which may include the target BS specific parts as well as common and UE specific parts. At operation 2503, the UE applies the reconfiguration parameters to set up the links and communicate with the target BS.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A user equipment (UE), comprising:
a processor; and
a transceiver operably coupled to the processor, the transceiver configured to:
  transmit, to a base station (BS), information indicating capability of the UE to support adaptation of a reference signal (RS) pattern,
  receive, from the BS, first configuration information, the first configuration information indicating one or more of enabling or disabling of adaptation of the RS pattern, a machine learning (ML) model used for ML adaptation of the RS pattern, updated model parameters for the ML model, or whether model parameters received from the UE will be used for ML adaptation of the RS pattern,
  receive, from the BS, second configuration information, the second configuration information indicating a first RS pattern,
  receive an RS with the first RS pattern,
  transmit, to the BS, assistance information,
  in response to transmitting the assistance information, receive, from the BS, third configuration information indicating a second RS pattern, wherein the first RS pattern is different from the second RS pattern, and
  receive the RS with the second RS pattern.

2. The UE of claim 1, wherein the transceiver is further configured to one of transmit information on one of a downlink RS pattern or an uplink RS pattern to the BS or receive a configuration of one of a downlink RS pattern or an uplink RS pattern from the BS.

3. The UE of claim 1, wherein the transceiver is configured to receive, from the BS, a configuration of the first RS pattern or the second RS pattern via radio resource control (RRC) signaling, wherein the configuration is indicated by one of an RS pattern index or a time/frequency density for the RS pattern.

4. The UE of claim 1, wherein the transceiver is configured to transmit, to the BS, assistance information to support adaptation of an RS pattern, wherein:
  the assistance information comprises one or more of UE location, UE speed, UE trajectory, estimated downlink (DL) channel delay spread, estimated DL channel Doppler spread, estimated DL channel coherence bandwidth, estimated DL channel coherence time, or radio resource management (RRM) metrics,
  the assistance information is used for model inference of an RS pattern,
  a format for the assistance information is transmitted via a physical uplink control channel (PUCCH) or a physical uplink shared channel (PUSCH), and
  the format for the assistance information comprises one of a new uplink control information (UCI) type, a new PUCCH format, or a new media access control control element (MAC CE).

5. The UE of claim 4, wherein:
  the assistance information includes an ML model inference result, and
  the ML model inference result comprises one or more of a recommendation for a reference symbol pattern index, a recommendation for a reference symbol density in the time domain, or a recommendation for a reference symbol density in the frequency domain.

6. The UE of claim 1, wherein the transceiver is configured to receive a configuration of one of a UE-specific or site-specific codebook or an update for the one of the UE-specific or site-specific codebook, the one of the UE-specific or site-specific codebook including:
  common parts and UE-specific or site-specific parts,
  a UE-specific or site-specific RS pattern, and
  artificial intelligence (AI) or ML parameters for channel state information (CSI) feedback.

7. The UE of claim 6, wherein the UE is configured to use a default codebook in addition to the one of the UE-specific or site-specific codebook.

8. The UE of claim 1, wherein;
  the processor is configured to perform ML model training, or
  the transceiver is further configured to receive trained ML model parameters.

9. A method, comprising:
- transmitting, from a user equipment (UE) to a base station (BS), information indicating capability of the UE to support adaptation of a reference signal (RS) pattern;
- receiving, from the BS, first configuration information, the first configuration information indicating one or more of enabling or disabling of adaptation of the RS pattern, a machine learning (ML) model used for ML adaptation of the RS pattern, updated model parameters for the ML model, or whether model parameters received from the UE will be used for ML adaptation of the RS pattern;
- receiving, from the BS, second configuration information, the second configuration information indicating a first RS pattern;
- receiving an RS with the first RS pattern;
- transmitting, to the BS, assistance information;
- in response to transmitting the assistance information, receiving, from the BS, third configuration information indicating a second RS pattern, wherein the first RS pattern is different from the second RS pattern; and
- receiving the RS with the second RS pattern.

10. The method of claim 9, comprising one of transmitting information on one of a downlink RS pattern or an uplink RS pattern to the BS or receiving a configuration of one of a downlink RS pattern or an uplink RS pattern from the BS.

11. The method of claim 9, comprising receiving, from the BS, a configuration of the first RS pattern or the second RS pattern via radio resource control (RRC) signaling, wherein the configuration is indicated by one of an RS pattern index or a time/frequency density for the RS pattern.

12. The method of claim 9, comprising transmitting, to the BS, assistance information to support adaptation of an RS pattern, wherein:
- the assistance information comprises one or more of UE location, UE speed, UE trajectory, estimated downlink (DL) channel delay spread, estimated DL channel Doppler spread, estimated DL channel coherence bandwidth, estimated DL channel coherence time, or radio resource management (RRM) metrics,
- the assistance information is used for model inference of an RS pattern,
- a format for the assistance information is transmitted via a physical uplink control channel (PUCCH) or a physical uplink shared channel (PUSCH), and
- the format for the assistance information comprises one of a new uplink control information (UCI) type, a new PUCCH format, or a new media access control control element (MAC CE).

13. The method of claim 12, wherein:
- the assistance information includes an ML model inference result, and
- the ML model inference result comprises one or more of a recommendation for a reference symbol pattern index, a recommendation for a reference symbol density in the time domain, or a recommendation for a reference symbol density in the frequency domain.

14. The method of claim 9, comprising receiving a configuration of one of a UE-specific or site-specific codebook or an update for the one of the UE-specific or site-specific codebook, the one of the UE-specific or site-specific codebook including:
- common parts and UE-specific or site-specific parts,
- a UE-specific or site-specific RS pattern, and
- artificial intelligence (AI) or ML parameters for channel state information (CSI) feedback.

15. The method of claim 14, wherein the UE is configured to use a default codebook in addition to the one of the UE-specific or site-specific codebook.

16. The method of claim 14, wherein the one of the UE-specific or site-specific codebook is a precoding matric indicator (PMI)-based codebook in which a set of precoding matrices and corresponding indices are UE-specifically or site-specifically configured.

17. A base station (BS), comprising:
- a processor; and
- a transceiver configured to
  - receive, from a user equipment (UE), information indicating capability of the UE to support machine learning (ML) adaptation of a reference signal (RS) pattern,
  - transmit, to the UE, first configuration information, the first configuration information indicating one or more of enabling or disabling of adaptation of the RS pattern, an ML model used for ML adaptation of the RS pattern, updated model parameters for the ML model, or whether model parameters received from the UE will be used for ML adaptation of the RS pattern,
  - transmit, to the UE, second configuration information, the second configuration information indicating a first RS pattern,
  - transmit an RS with the first RS pattern,
  - receive, from the UE, assistance information,
  - in response to receiving the assistance information, transmit, to the UE, third configuration information indicating a second RS pattern, wherein the first RS pattern is different from the second RS pattern, and
  - transmit the RS with the second RS pattern.

18. The BS of claim 17, wherein the transceiver is configured to transmit a configuration of one of a downlink RS pattern or an uplink RS pattern to the UE.

19. The BS of claim 17, wherein the transceiver is configured to transmit, to the UE, a configuration of the first RS pattern or the second RS pattern via radio resource control (RRC) signaling, wherein the configuration is indicated by one of an RS pattern index or a time/frequency density for the RS pattern.

20. The BS of claim 17, wherein the transceiver is configured to receive, from the UE, assistance information to support adaptation of an RS pattern, wherein:
- the assistance information comprises one or more of UE location, UE speed, UE trajectory, estimated downlink (DL) channel delay spread, estimated DL channel Doppler spread, estimated DL channel coherence bandwidth, estimated DL channel coherence time, or radio resource management (RRM) metrics,
- the assistance information is used for model inference of an RS pattern,
- a format for the assistance information is transmitted via a physical uplink control channel (PUCCH) or a physical uplink shared channel (PUSCH), and
- the format for the assistance information comprises one of a new uplink control information (UCI) type, a new PUCCH format, or a new media access control control element (MAC CE).

* * * * *